United States Patent
Rangarajan et al.

(10) Patent No.: US 11,493,986 B2
(45) Date of Patent: Nov. 8, 2022

(54) METHOD AND SYSTEM FOR IMPROVING ROCK BOTTOM SLEEP CURRENT OF PROCESSOR MEMORIES

(71) Applicant: QUALCOMM Incorporated, San Diego, CA (US)

(72) Inventors: Bharat Kumar Rangarajan, Bangalore (IN); Rajesh Arimilli, Bangalore (IN); Srinivas Turaga, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/724,317

(22) Filed: Dec. 22, 2019

(65) Prior Publication Data
US 2021/0191500 A1 Jun. 24, 2021

(51) Int. Cl.
*G06F 1/00* (2006.01)
*G06F 1/3234* (2019.01)
*G06F 1/3293* (2019.01)
*G06F 1/3296* (2019.01)

(52) U.S. Cl.
CPC .......... *G06F 1/3275* (2013.01); *G06F 1/3293* (2013.01); *G06F 1/3296* (2013.01)

(58) Field of Classification Search
CPC .................................................... G06F 1/3275
See application file for complete search history.

(56) References Cited

U.S. PATENT DOCUMENTS

| | | | | |
|---|---|---|---|---|
| 5,931,951 A * | 8/1999 | Ando | ........... | G06F 1/3228 713/324 |
| 6,983,388 B2 * | 1/2006 | Kaxiras | ........... | G11C 5/143 711/145 |
| 10,268,486 B1 * | 4/2019 | Mitra | ........... | G06F 1/3287 |
| 10,379,874 B1 * | 8/2019 | Venkatasamy | ........ | G06F 1/3212 |
| 2011/0252251 A1 * | 10/2011 | de Cesare | ........... | G06F 1/3237 713/320 |
| 2014/0208142 A1 * | 7/2014 | Tamura | ........... | G06F 1/3275 713/322 |
| 2015/0370313 A1 * | 12/2015 | Tamura | ........... | H01L 29/7869 713/323 |
| 2015/0370707 A1 * | 12/2015 | Patsilaras | ........... | G06F 12/084 711/121 |
| 2016/0179177 A1 * | 6/2016 | Henry | ........... | G06F 9/30083 713/320 |
| 2019/0065359 A1 * | 2/2019 | Rangarajan | ........ | G06F 11/3656 |
| 2019/0121652 A1 * | 4/2019 | Tayeb | ........... | G06F 15/167 |
| 2019/0212768 A1 * | 7/2019 | Rangarajan | ........... | G06F 1/10 |
| 2019/0216293 A1 * | 7/2019 | Yoda | ........... | A61B 1/00027 |
| 2019/0346908 A1 * | 11/2019 | Srinivas | ........... | G06F 1/3275 |
| 2021/0055921 A1 * | 2/2021 | Sebot | ........... | G06F 1/3296 |
| 2022/0264046 A1 * | 8/2022 | Inoue | ........... | H01L 23/522 |

\* cited by examiner

*Primary Examiner* — Mohammed H Rehman
(74) *Attorney, Agent, or Firm* — The Marbury Law Group/Qualcomm

(57) ABSTRACT

Various embodiments include methods and devices for cache memory power control. Some embodiments may include determining whether a processor is entering a lowest power mode of the processor, and switching a lowest power mode switch control signal to indicate to a cache power switch of the processor switching an electrical connection of a cache memory from a memory power rail to a processor power rail in response to determining that the processor is entering a lowest power mode.

28 Claims, 11 Drawing Sheets

METHOD AND SYSTEM FOR IMPROVING ROCK BOTTOM SLEEP CURRENT OF PROCESSOR MEMORIES

BACKGROUND

Processor products have high performance requirements, which includes the frequency at which the processor cores are running. To meet the required frequency targets, high performing standard cells and memories are used. Use of these high performing components causes increases in dynamic power and leakage power in various power modes.

SUMMARY

Various disclosed aspects may include apparatuses and methods for cache memory power control. Various aspects may include determining whether a processor is entering a lowest power mode of the processor, and switching a lowest power mode switch control signal to indicate to a cache power switch of the processor switching an electrical connection of a cache memory from a memory power rail to a processor power rail in response to determining that the processor is entering a lowest power mode.

Some aspects may further include determining whether a power rail state of the cache power switch of the processor indicates that the cache memory is electrically connected to the memory power rail in response to determining that the processor is entering the lowest power mode. In some aspects, switching a lowest power mode switch control signal to indicate to the cache power switch of the processor switching an electrical connection of a cache memory from a memory power rail to a processor power rail may occur in response to determining that the power rail state of the cache power switch of the processor indicates that the cache memory is electrically connected to the memory power rail.

Some aspects may further include receiving a processor low power mode signal indicating to a cache lowest power mode controller the lowest power mode of the processor. In some aspects, determining whether a processor is entering a lowest power mode of the processor may include interpreting by the cache lowest power mode controller that the processor low power mode signal indicates the lowest power mode of the processor.

Some aspects may further include determining whether the processor is exiting the lowest power mode of the processor, and switching the lowest power mode switch control signal to indicate to the cache power switch of the processor that the electrical connection of the cache memory should be switched from the processor power rail to the memory power rail to in response to determining that the processor is exiting the lowest power mode.

Some aspects may further include receiving a power rail state signal indicating to a cache lowest power mode controller a power rail state of the cache power switch of the processor, storing the power rail state, and in response to determining that the processor is exiting the lowest power mode retrieving the stored power rail state, and determining whether the stored power rail state of the cache power switch of the processor indicates that the cache memory was connected to the memory power rail prior to the processor entering the lowest power mode. In such aspects, switching the lowest power mode switch control signal to indicate to a cache power switch of the processor that the electrical connection of the cache memory should be switched from the processor power rail to the memory power rail may occur in response to determining that the stored power rail state of the cache power switch of the processor indicates that the cache memory was connected to the memory power rail prior to the processor entering the lowest power mode.

Some aspects may further include comparing a voltage of the processor power rail and a voltage of the memory power rail, determining whether the voltage of the processor power rail exceeds the voltage of the memory power rail, outputting a first power rail state signal indicating to a cache lowest power mode controller switching the cache memory from the memory power rail to the processor power rail for the lowest power mode of the processor in response to determining that the voltage of the processor power rail does not exceed the voltage of the memory power rail, and outputting a second power rail state signal indicating to the cache lowest power mode controller that it should maintain electrical connection of the processor power rail to the cache memory for the lowest power mode of the processor in response to determining that the voltage of the processor power rail exceeds the voltage of the memory power rail.

Some aspects may further include receiving the lowest power mode switch control signal, determining whether the lowest power mode switch control signal indicates to a cache power switch controller that the electrical connection of the cache memory should be switched from the memory power rail to the processor power rail, outputting a first switch selection control signal indicating to the cache power switch of the processor selectively electrically connecting the processor power rail to the cache memory in response to determining that the lowest power mode switch control signal indicates to the cache power switch controller that the electrical connection of the cache memory should be switched from the memory power rail to the processor power rail, and outputting a second switch selection control signal indicating to the cache power switch of the processor maintaining electrical connection of the processor power rail to the cache memory in response to determining that the lowest power mode switch control signal does not indicate to the cache power switch controller that the electrical connection of the cache memory should be switched from the memory power rail to the processor power rail.

Some aspects may further include receiving a third switch selection control signal, determining whether the third switch selection control signal indicates to the cache power switch of the processor selectively electrically connecting the processor power rail to the cache memory, electrically connecting the processor power rail to the cache memory in response to determining that the third switch selection control signal indicates to the cache power switch of the processor selectively electrically connecting the processor power rail to the cache memory, in which the third switch selection control signal is the first switch selection control signal, and maintaining electrical connection of the processor power rail to the cache memory in response to determining that the third switch selection control signal does not indicate to the cache power switch of the processor selectively electrically connecting the processor power rail to the cache memory, in which the third switch selection control signal is the second switch selection control signal.

Various aspects include systems on chip (SoC) including a processor having a cache memory, a cache power switch configured to selectively electrically connect the cache memory to a memory power rail and a processor power rail, and a cache lowest power mode controller communicatively connected to the processor and the cache power switch and configured to perform operations of any of the methods summarized above. Various aspects include SoCs having means for performing functions of any of the methods summarized above. Various aspects include a non-transitory, processor-readable medium on which are stored processor-executable instructions configured to cause a processor to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
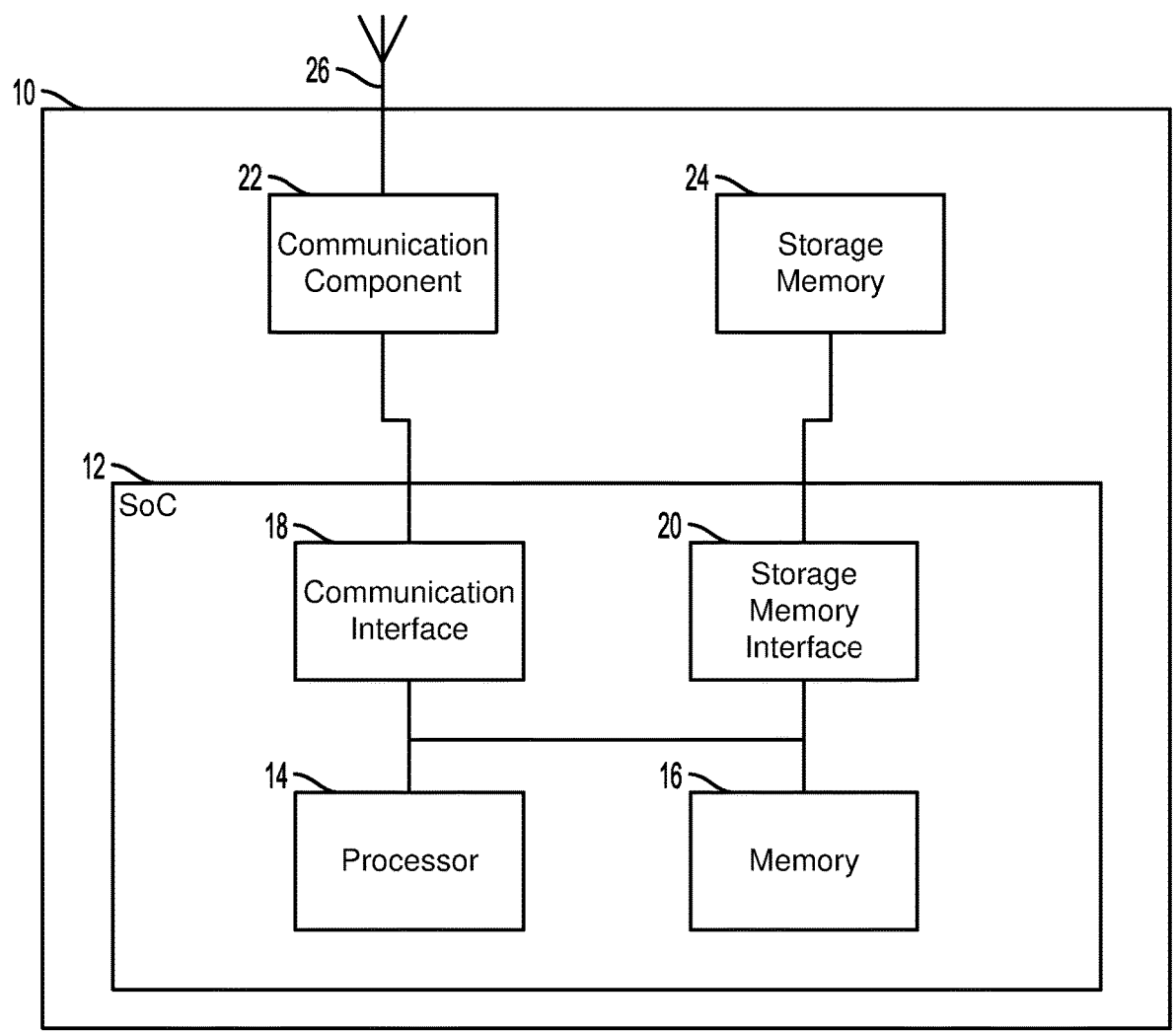
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments may include methods, and computing devices implementing such methods for improving a rock bottom sleep current of processor memories. Some embodiments may include a cache lowest power mode controller configured to generate signals indicating control of selecting a power source for a cache memory of a processor. Some embodiments may include a cache power multiplexer configured to select a power source for a cache memory responsive to signals indicating control of selecting a power source for the cache memory. Some embodiments may include selecting a processor power rail, rather than a dedicated cache memory power rail, as a power source for the cache memory in response to the processor entering into a lowest processor power mode.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

A processor may support various power modes, including operating power modes and low (or standby) power modes. A computing device may provide power to different components of a processor from different power sources during different power modes. In an operating power mode, a processor may be operable to process instructions and data. Different operating power modes may be associated with different levels of processor performance speeds and require different levels of power to achieve the associated processor performance speeds. Components of a processor may receive power from power sources, such as dedicated or shared power rails, having different voltage levels to achieve the associated processor performance speeds. For example, for a nominal operating power mode, a computing device may provide power to a processor core and to a cache memory of the processor via separate power rails. The processor core may draw voltage from a dedicated power rail, and the cache memory may draw voltage from a shared power rail shared with other memory devices. For an elevated operating power mode, a computing device may provide power to a processor core and a cache memory from a single power rail. The processor core and the cache memory may draw voltage from the dedicated power rail, and an increased voltage demand by the cache memory may not penalize the other memory devices that draw voltage from the shared power rail.

In a low power mode, a processor may not be operable to process instructions and data, but a computing device may still provide power to power rails for powering components of the processor. For example, a processor may support four low power modes, listed in order of decreasing power demand and in which each lower low power mode includes the description of all the higher low power modes: a first low power mode in which the processor may be in a wait mode (e.g., wait-for-interrupt or wait-for-event) and the gating clock may be stopped or gated; a second low power mode in which data in a cache memory may be retained while periphery memory logic may be power-collapsed; a third low power mode in which power switches in a processor may be opened to power-collapse processor logic and the cache memory internally; and a fourth low power mode in which a power rail for providing power to the processor may be power-collapsed to completely power-collapse the processor.

While not intending to be limited to a particular power mode configuration, in the first low power mode the processor may be put in the wait mode and the clocks for the processor and/or cache memories of the processor may be stopped or gated to off, disabling the functionalities of the processor and/or cache memories while retaining stored data. The first low power mode may reduce the amount of dynamic power used by the processor.

While not intending to be limited to a particular power mode configuration, the second low power mode may include the configurations of the first low power mode, and in addition the cache memories may be put into a retention mode and the periphery memory logic may be put into a retention mode or put into power-collapse. Power-collapse of the periphery memory logic may be implemented internally by the processor by disconnecting processor internal power supply connections to the periphery memory logic. In addition to the power savings of the first low power mode, the second low power mode may reduce the amount of active leakage power to the periphery memory logic.

While not intending to be limited to a particular power mode configuration, the third low power mode may include the configurations of the first low power modes, and in addition the cache memories, the periphery memory logic, and/or the processor logic may be put into power-collapse by disconnecting the power supply to the cache memories, the periphery memory logic, and/or the processor logic. Power-collapse of the cache memories, the periphery memory logic, and/or the processor logic may be implemented internally by the processor by disconnecting processor internal power supply connections to the cache memories, the periphery memory logic, and/or the processor logic. In addition to the power savings of the first and second low power modes, the third low power mode may reduce the amount of active leakage power to the cache memories and the processor logic.

While not intending to be limited to a particular power mode configuration, the fourth low power mode may include the configurations of the first, second, and third low power modes, and in addition the processor power rail, configured to provide power to the processor, may be put into power-collapse by disconnecting the power supply to the processor power rail. Power-collapse of the processor power rail may be implemented in a power management integrated circuit by disconnecting connections between the processor power rail and a power supply external to the processor. In addition to the power savings of the first, second, and third low power modes, the fourth low power mode may reduce "OFF" leakage power to the processor logic.

However, as discussed above, a computing device may use multiple power rails to provide power to a processor and components of the processor, and some of the power rails may not be power-collapsed and may cause power leakage while the processor may be in a low power mode, such as in the third low power mode and the fourth low power mode. For example, the power rail used to provide power to the cache memory may not be power-collapsed and may continue to provide power to the processor for the cache memory, even when the cache memory may be power-collapsed, as in the third low power mode and the fourth low power mode. Continuing to provide power from the power rail to the processor for the power-collapsed cache memory may cause power leakage.

A processor may receive power via a processor power rail. In some embodiments, the processor power rail may be a dedicated processor power rail for providing power to the processor. In some embodiments, the processor power rail may be a shared processor power rail for providing power to multiple processors. A cache memory of a processor may receive power via a memory power rail in a nominal operating power mode and from the processor power rail in an elevated operating power mode. The memory power rail may be a power rail for providing power to various memories across a system on chip (SoC), and may not be power-collapsed when a processor enters a lowest of the low power modes (hereinafter a "lowest power mode"), such as the fourth low power mode. The processor may include a switch, such as a relay, a transistor, a logic circuit, analog power switch, etc., configured to selectably connect the cache memory to the processor power rail or to the memory power rail. The switch may be configured to electrically connect the cache memory to the memory power rail in a nominal operating power mode and to the processor power rail in an elevated operating power mode.

A computing device may include additional components to control electrical connections of the cache memory to the processor power rail and to the memory power rail, such as a cache lowest power mode controller. The cache lowest power mode controller may be configured to receive signals from components of the computing device, interpret the received signals to determine whether the processor may be entering or exiting the lowest power mode, and issue a lowest power mode switch control signal for signaling switching the power source of the cache memory between the processor power rail and the memory power rail.

The signals received or accessed by the cache lowest power mode controller may be any format of signal, such as a digital signal represented by a high or low voltage and/or a rising or trailing edge to a dedicated pin of the processor, a value stored to a register that can be accessed by the cache lowest power mode controller, and/or a message on a shared communication bus addressed to the cache lowest power mode controller. The cache lowest power mode controller may receive signals from a processor power manager indicating to the cache lowest power mode controller that a processor has entered or is entering a low power mode of the processor or that the processor is initiating a wakeup process. The cache lowest power mode controller may receive a signal from the processor indicating to the cache lowest power mode controller that the processor is in a wait mode. The cache lowest power mode controller may receive a signal from a cache power switch, for example, via the processor, indicating to the cache lowest power mode controller the current state and/or a change in state of a power rail. The cache power switch may be any type of electronic switch, such as a relay, a transistor, a logic circuit, analog power switch, etc.

Based on an interpretation of the received signals, the cache lowest power mode controller may generate and output a lowest power mode switch control signal indicating to the cache power switch to switch the power source of the cache memory between the processor power rail and the memory power rail. The cache power switch may be any type of electronic switch, such as a relay, a transistor, a logic circuit, analog power switch, etc. Further, the cache power switch may be directly or indirectly connected to the cache lowest power mode controller. For example, the cache power switch may be indirectly connected to the cache lowest power mode controller via a cache power switch controller. Based on an interpretation of the received signals that the processor is entering the lowest power mode, the cache lowest power mode controller may output a signal to the cache power switch or to a cache power switch controller to initiate a switch of the power source for the cache memory of the processor from the memory power rail to the processor power rail.

For the lowest power mode, the processor power rail may be power-collapsed and may not provide any power to the processor. Similarly, no power may be provided to the cache memory via the electrically connected processor power rail in the lowest power mode. The memory power rail may not be power-collapsed when the processor enters the lowest power mode since it is a shared power rail that may power other memories across the SoC. Switching the power source for the cache memory from the memory power rail to the processor power rail may avoid power leakage from the memory power rail to the power-collapsed cache memory of the processor, or "OFF" leakage power to the power-collapsed cache memory, in the lowest power mode. Avoiding such power leakage can conserve power, and thus extend battery endurance of devices including a computing device implementing various embodiments.

In some embodiments, the low power modes, including the lowest power modes, and control of the electrical connection of the power rails to cache memory may be implemented for an individual processor. In some embodiments, the low power modes, including the lowest power modes, and control of the electrical connection of the power rails to cache memory may be implemented for a cluster of processors.

A component of the computing device that includes the processor may also avoid power leakage from the memory power rail to the power-collapsed cache memory of the processor in the lowest power mode when entering a lowest power mode of the component. A process for the component to enter a lowest power mode may include the processor entering the lowest power mode before the component enters the lowest power mode. For example, a lowest power mode of the component of the computing device may include a lowest power mode of an SoC having the processor, or a rock bottom sleep current of the SoC. For the SoC to enter the lowest power mode, all of the processors within the SoC may first enter the lowest power mode. By default, the process of an SoC entering the lowest power mode may include switching the cache memory of each processor within the system from the memory power rail to the processor power rail, which may occur when each processor enters the lowest power mode for the processor. As a result, the lowest power mode of the SoC therefore may receive the benefit of avoiding power leakage from a memory power rail to a power-collapsed cache memory of a processor in the lowest power mode. Contents of the cache memory may be flushed to a main memory or a random access memory (RAM) when the processor enters the lowest power mode. The SoC may include other memories whose contents may need to be retained when the SoC as a whole enters the lowest power mode of the SoC. The memory power rail of the SoC may not be shut off for the lowest power mode of the SoC so that the contents of the other memories may be retained so that the SoC may wake up faster from the lowest power mode of the SoC.

FIG. 1 illustrates a system including a computing device 10 suitable for use with various embodiments. The computing device 10 may include a system-on-chip (SoC) 12 with a processor 14, a memory 16, a communication interface 18, and a storage memory interface 20. The computing device 10 may further include a communication component 22, such as a wired or wireless modem, a storage memory 24, and an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a "miss," because the requested data or processor-executable code is not located in the memory 16. In response to a miss, a memory access request to another memory 16 or storage memory 24 may be made to load the requested data or processor-executable code from the other memory 16 or storage memory 24 to the memory 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 and/or the SoC 12 may be arranged differently and/or combined while still serving the functions of the various embodiments. The computing device 10 may not be limited to one of each of the components, and multiple instances of each component may be included in various configurations of the computing device 10.

Figure 2:
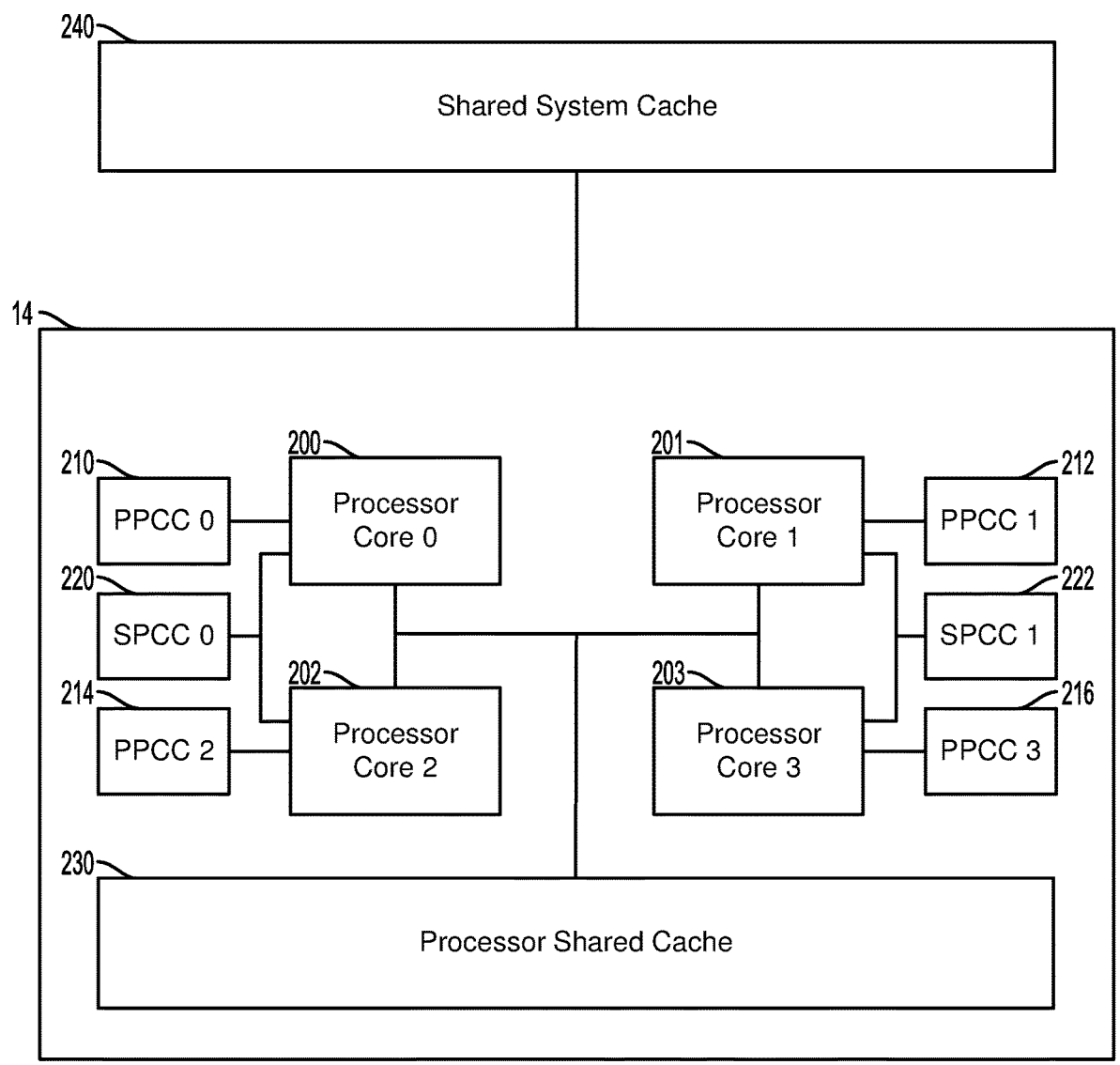
FIG. 2 is a component block diagram illustrating an example multicore processor suitable for implementing various embodiments.

FIG. 2 illustrates components of a computing device suitable for implementing an embodiment. The processor 14 may include multiple processor types, including, for example, a CPU and various hardware accelerators, such as a GPU, a DSP, an APU, an SPU subsystem processor, etc. The processor 14 may also include a custom hardware accelerator, which may include custom processing hardware and/or general purpose hardware configured to implement a specialized set of functions. The processors 14 may include any number of processor cores 200, 201, 202, 203. A processor 14 having multiple processor cores 200, 201, 202, 203 may be referred to as a multicore processor.

The processor 14 may have a plurality of homogeneous or heterogeneous processor cores 200, 201, 202, 203. A homogeneous processor may include a plurality of homogeneous processor cores. The processor cores 200, 201, 202, 203 may be homogeneous in that, the processor cores 200, 201, 202, 203 of the processor 14 may be configured for the same purpose and have the same or similar performance characteristics. For example, the processor 14 may be a general purpose processor, and the processor cores 200, 201, 202, 203 may be homogeneous general purpose processor cores. The processor 14 may be a GPU or a DSP, and the processor cores 200, 201, 202, 203 may be homogeneous graphics processor cores or digital signal processor cores, respectively. The processor 14 may be a custom hardware accelerator with homogeneous processor cores 200, 201, 202, 203.

A heterogeneous processor may include a plurality of heterogeneous processor cores. The processor cores 200, 201, 202, 203 may be heterogeneous in that the processor cores 200, 201, 202, 203 of the processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar embodiments, an SoC (for example, SoC 12 of FIG. 1) may include any number of homogeneous or heterogeneous processors 14. In various embodiments, not all off the processor cores 200, 201, 202, 203 need to be heterogeneous processor cores, as a heterogeneous processor may include any combination of processor cores 200, 201, 202, 203 including at least one heterogeneous processor core.

Each of the processor cores 200, 201, 202, 203 of a processor 14 may be designated a private processor core cache (PPCC) memory 210, 212, 214, 216 that may be dedicated for read and/or write access by a designated processor core 200, 201, 202, 203. The private processor core cache 210, 212, 214, 216 may store data and/or instructions, and make the stored data and/or instructions available to the processor cores 200, 201, 202, 203 to which the private processor core cache 210, 212, 214, 216 is dedicated for use in execution by the processor cores 200, 201, 202, 203. The private processor core cache 210, 212, 214, 216 may include volatile memory as described herein with reference to memory 16 of FIG. 1.

Groups of the processor cores 200, 201, 202, 203 of a processor 14 may be designated a shared processor core cache (SPCC) memory 220, 222 that may be dedicated for read and/or write access by a designated group of processor core 200, 201, 202, 203. The shared processor core cache 220, 222 may store data and/or instructions, and make the stored data and/or instructions available to the group processor cores 200, 201, 202, 203 to which the shared processor core cache 220, 222 is dedicated, for use in execution by the processor cores 200, 201, 202, 203 in the designated group. The shared processor core cache 220, 222 may include volatile memory as described herein with reference to memory 16 of FIG. 1.

The processor 14 may include a shared processor cache memory 230 that may be dedicated for read and/or write access by the processor cores 200, 201, 202, 203 of the processor 14. The shared processor cache 230 may store data and/or instructions, and make the stored data and/or instructions available to the processor cores 200, 201, 202, 203, for use in execution by the processor cores 200, 201, 202, 203. The shared processor cache 230 may also function as a buffer for data and/or instructions input to and/or output from the processor 14. The shared cache 230 may include volatile memory as described herein with reference to memory 16 (FIG. 1).

Multiple processors 14 may access a shared system cache memory 240 that may be dedicated for read and/or write access by the processor cores 200, 201, 202, 203 of the multiple processors 14. The shared system cache 240 may store data and/or instructions, and make the stored data and/or instructions available to the processor cores 200, 201, 202, 203 for use in execution by the processor cores 200, 201, 202, 203. The shared system cache 240 may also function as a buffer for data and/or instructions input to and/or output from the multiple processors 14. The shared system cache 240 may include volatile memory as described herein with reference to memory 16 illustrated in FIG. 1.

In the example illustrated in FIG. 2, the processor 14 includes four processor cores 200, 201, 202, 203 (i.e., processor core 0, processor core 1, processor core 2, and processor core 3). In the example, each processor core 200, 201, 202, 203 is designated a respective private processor core cache 210, 212, 214, 216 (i.e., processor core 0 and private processor core cache 0, processor core 1 and private processor core cache 1, processor core 2 and private processor core cache 2, and processor core 3 and private processor core cache 3). The processor cores 200, 201, 202, 203 may be grouped, and each group may be designated a shared processor core cache 220, 222 (i.e., a group of processor core 0 and processor core 2 and shared processor core cache 0, and a group of processor core 1 and processor core 3 and shared processor core cache 1). For ease of explanation, the examples herein may refer to the four processor cores 200, 201, 202, 203, the four private processor core caches 210, 212, 214, 216, two groups of processor cores 200, 201, 202, 203, and the shared processor core cache 220, 222 illustrated in FIG. 2. However, the four processor cores 200, 201, 202, 203, the four private processor core caches 210, 212, 214, 216, two groups of processor cores 200, 201, 202, 203, and the shared processor core cache 220, 222 illustrated in FIG. 2 and described herein are merely provided as an example and in no way are meant to limit the various embodiments to a four-core processor system with four designated private processor core caches and two designated shared processor core caches 220, 222. The computing device 10, the SoC 12, or the processor 14 may individually or in combination include fewer or more than the four processor cores 200, 201, 202, 203 and private processor core caches 210, 212, 214, 216, and two shared processor core caches 220, 222 illustrated and described herein.

In various embodiments, a processor core 200, 201, 202, 203 may access data and/or instructions stored in the shared processor core cache 220, 222, the shared processor cache 230, and/or the shared system cache 240 indirectly through access to data and/or instructions loaded to a higher level cache memory from a lower level cache memory. For example, levels of the various cache memories 210, 212, 214, 216, 220, 222, 230, 240 in descending order from highest level cache memory to lowest level cache memory may be the private processor core cache 210, 212, 214, 216, the shared processor core cache 220, 222, the shared processor cache 230, and the shared system cache 240. In various embodiments, data and/or instructions may be loaded to a cache memory 210, 212, 214, 216, 220, 222, 230, 240 from a lower level cache memory and/or other memory (e.g., memory 16, 24 illustrated in FIG. 1) as a response to a miss the cache memory 210, 212, 214, 216, 220, 222, 230, 240 for a memory access request, and/or as a response to a prefetch operation speculatively retrieving data and/or instructions for future use by the processor core 200, 201, 202, 203. In various embodiments, the cache memory 210, 212, 214, 216, 220, 222, 230, 240 may be managed using an eviction policy to replace data and/or instructions stored in the cache memory 210, 212, 214, 216, 220, 222, 230, 240 to allow for storing other data and/or instructions. Evicting data and/or instructions may include writing the evicted data and/or instructions evicted from a higher level cache memory 210, 212, 214, 216, 220, 222, 230 to a lower level cache memory 220, 222, 230, 240 and/or other memory.

For ease of reference, the terms "hardware accelerator," "custom hardware accelerator," "multicore processor," "processor," and "processor core" may be used interchangeably herein. The descriptions herein of the illustrated computing device and its various components are only meant to be exemplary and in no way limiting. Several of the components of the illustrated example computing device may be variably configured, combined, and separated. Several of the components may be included in greater or fewer numbers, and may be located and connected differently within the SoC or separate from the SoC.

Figure 3:
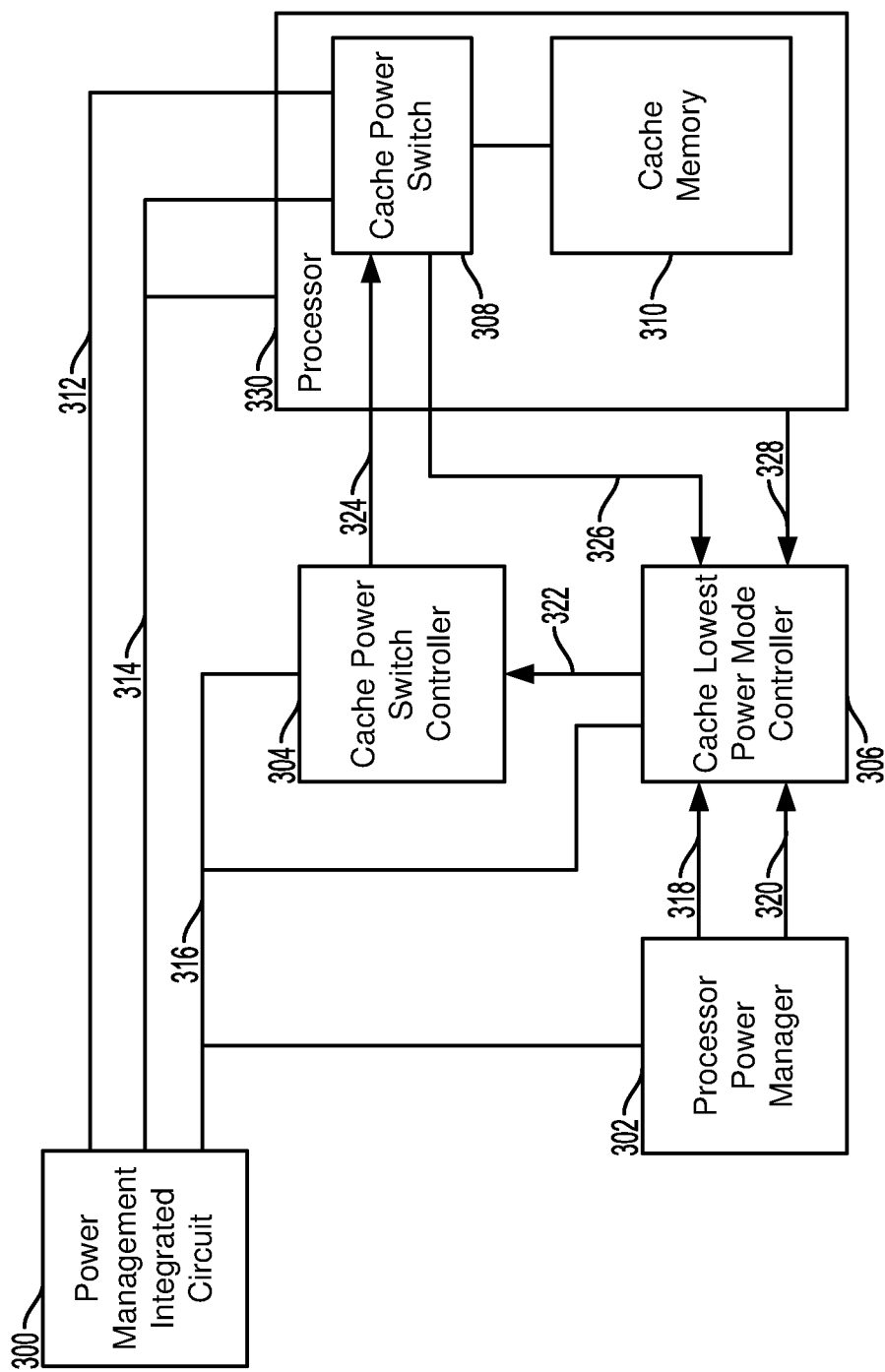
FIG. 3 is a component block diagram illustrating an example cache memory power control system suitable for implementing various embodiments.
Figure 4:
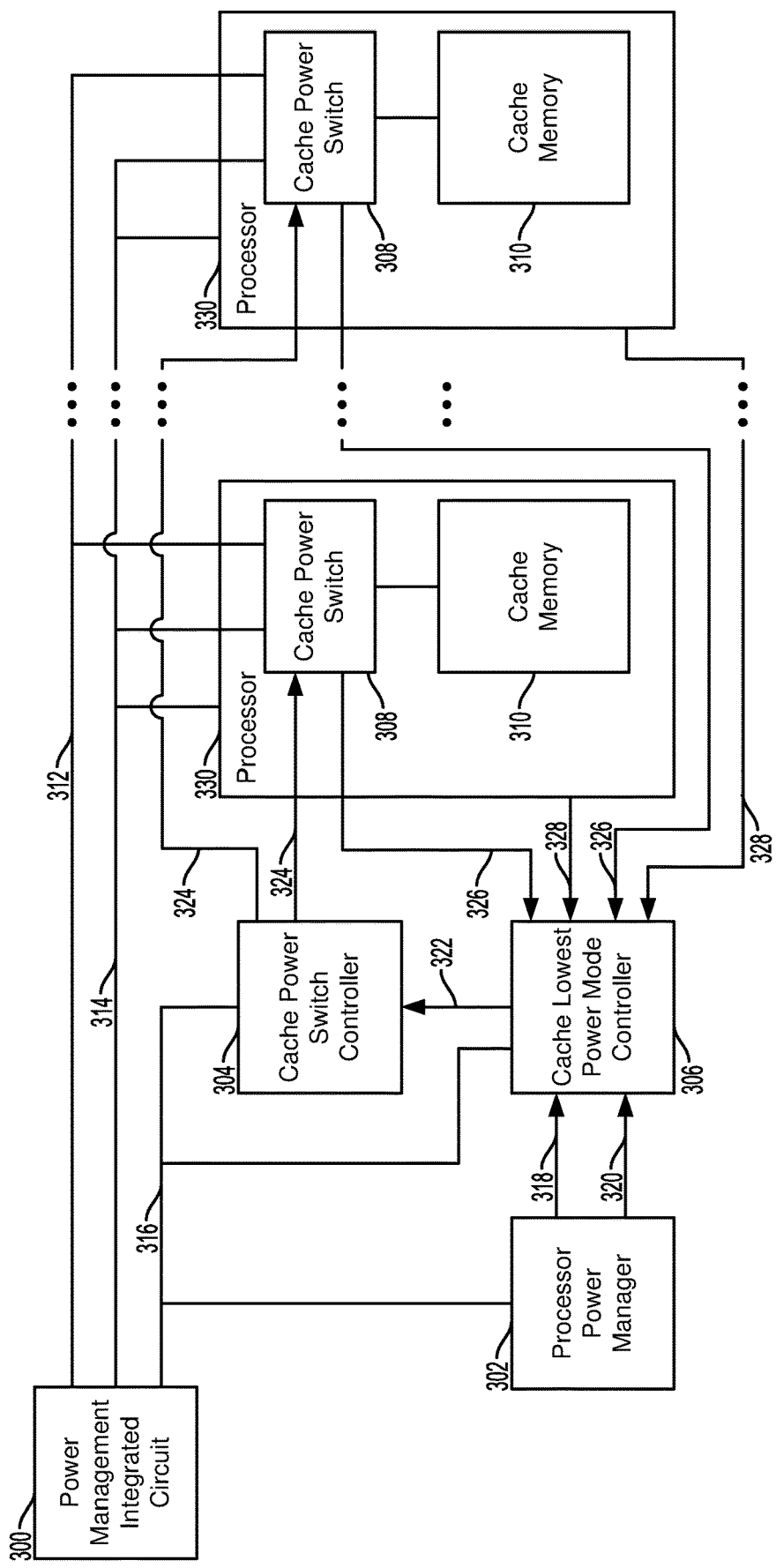
FIG. 4 is a component block diagram illustrating an example cache memory power control system suitable for implementing various embodiments.
Figure 5:
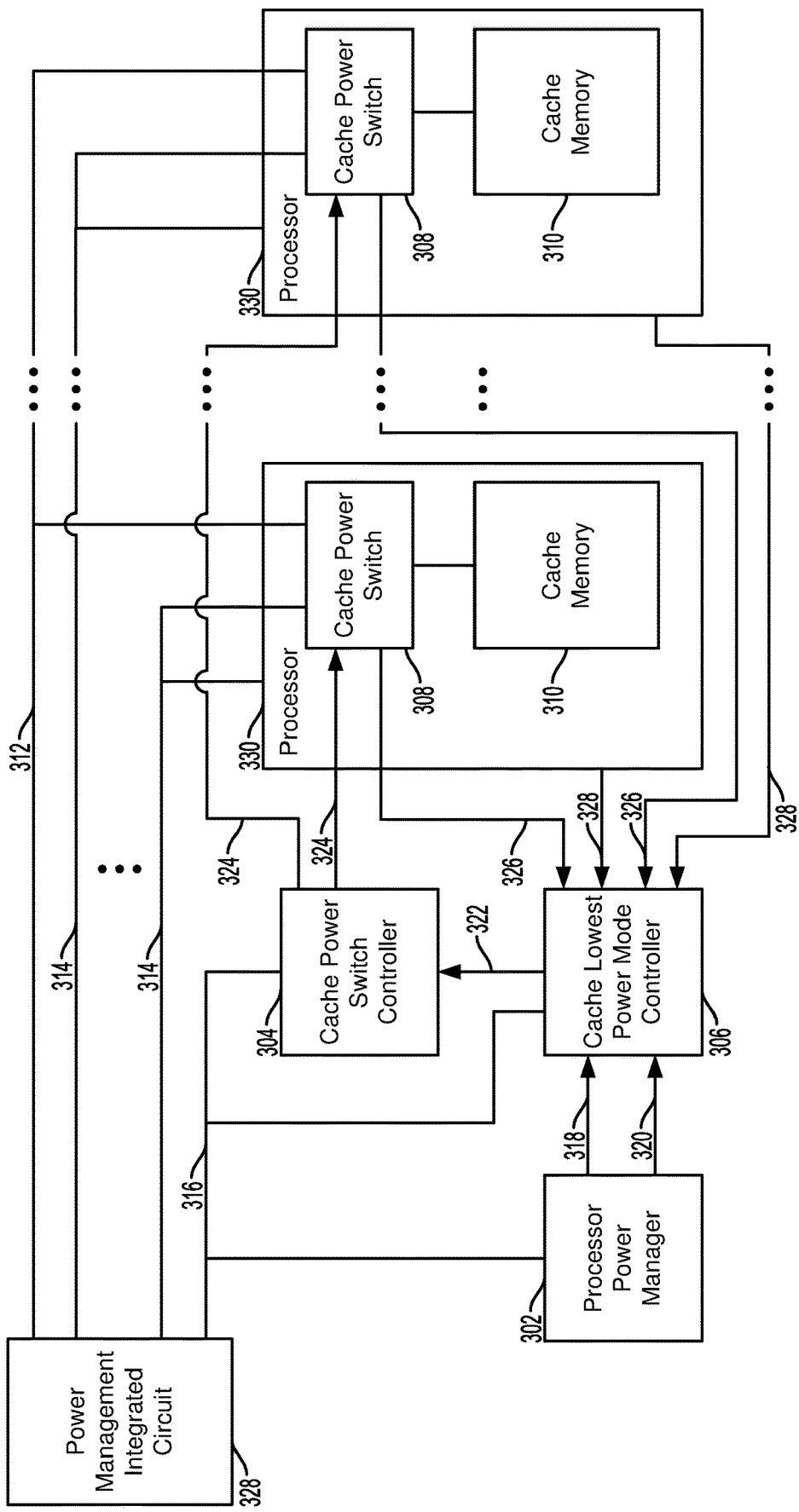
FIG. 5 is a component block diagram illustrating an example cache memory power control system suitable for implementing various embodiments.

FIGS. 3-5 illustrate example cache memory power control systems suitable for implementing various embodiments. With reference to FIGS. 1-5, a cache memory power control system of a computing device (e.g., computing device 10 in FIG. 1) may include a power management integrated circuit (PMIC) 300, a processor power manager 302, a cache power switch controller 304, a cache lowest power mode controller 306, a processor 330 (e.g., processor 14, 200, 201, 202, 203 in FIGS. 1 and 2), a memory power rail 312, a processor power rail 314, and a logic power rail 316. The processor 330 may include a cache power switch 308, such as a relay, a transistor, a logic circuit, analog power switch, etc., and a cache memory 310 (e.g., cache memory 210, 212, 214, 216, 220, 222, 230 in FIG. 2). The cache memory power control system may be an integral component of an SoC (e.g., SoC 12 in FIGS. 1 and 2). FIGS. 3-5 illustrate various embodiments that are meant to be illustrative examples and not limiting of the scope of the claims.

A PMIC 300 may be configured to provide power from a power source of the computing device (not shown) to the various power rails 312, 314, 316. The PMIC 300 may condition the power received from the power source for provision to the various power rails 312, 314, 316. For example, the PMIC may convert direct current (DC) voltage and/or scale voltage of the power received from the power source and provided to the various power rails 312, 214, 316. In some embodiments, the PMIC 300 may control the amount of power provided to the processor power rail 314 in support of the power modes of the processor 330. For example, for the processor 330 entering a lowest power mode, the PMIC 300 may provide no power to the processor power rail 314 and the processor power rail 314 may be power-collapsed. At the same time, the PMIC 300 may continue to provide power to the memory power rail 312 and the logic power rail 316. In some embodiments, the memory power rail 312 may not be power-collapsed.

A processor 330 may be electrically connected to the processor power rail 314 and the memory power rail 312. The processor 330 may use power received from the processor power rail 314 to power logic components of the processor 330, and use power received from the processor power rail 314 and/or the memory power rail 312 to power the cache memory 310 of the processor 330. The cache memory 310 may include any number and combination of cache memories and cache levels. In some embodiments, the cache memory 310 may include L1 and L2 cache memories.

A cache power switch 308 of the processor 330 may be configured to selectively connect and disconnect the cache memory 310 to and from the processor power rail 314 and/or the memory power rail 312. The cache power switch 308 may be any type of circuit or circuit element that can be controlled to selectively engage and disengage electrical connections, such as a relay, a transistor, a logic circuit, analog power switch, etc. In some embodiments, the cache power switch 308 may be a multiplexer.

A computing device may include additional components to control electrical connections of the cache memory 310 to the processor power rail 314 and to the memory power rail 312, such as a cache lowest power mode controller 306. The cache lowest power mode controller 306 may be configured to receive signals 318, 320, 326, 328 from components of the computing device, interpret the received signals 318, 320, 326, 328 to determine whether the processor 330 may be entering or exiting a lowest power mode, and issue a lowest power mode switch control signal 322 that initiates switching the power source of the cache memory 310 between the processor power rail 314 and the memory power rail 312. The signals 318, 320, 322, 326, 328 may be any format of signal, such as a digital signal represented by a high or low voltage and/or a rising or trailing edge to a dedicated pin of the processor, a value stored to a register that can be accessed by the cache lowest power mode controller 306, and/or a message on a shared communication bus addressed to the cache lowest power mode controller. The cache lowest power mode controller 306 may receive signals 318, 320 from a processor power manager 302 indicating to the cache lowest power mode controller 306 that a processor has entered or is entering a low power mode of the processor or that the processor 330 is initiating a wakeup process. The cache lowest power mode controller 306 may receive a signal 328 from the processor 330 indicating to the cache lowest power mode controller 306 that the processor 330 is in a wait mode. The cache lowest power mode controller 306 may receive a signal 326 from the cache power switch 308, for example, via the processor 330, indicating to the cache lowest power mode controller 306 the current state and/or a change in state of a power rail state. Based on an interpretation of the received signals 318, 320, 326, 328, the cache lowest power mode controller 306 may generate and output a lowest power mode switch control signal configured to cause the cache power switch 308 to switch the power source of the cache memory between the processor power rail and to the memory power rail. In some embodiments, the cache lowest power mode controller 306 may output a lowest power mode switch control signal 322 to the cache power switch 308 via a cache power switch controller 304.

The cache power switch 308 may be further configured to compare the power on the processor power rail 314 and the memory power rail 312, and to generate a power rail state signal 326 based the comparison. In some embodiments, the cache power switch 308 may include a comparator circuit (not shown) configured to compare the voltages of the power rails 312, 314, and to generate and output the power rail state signal 326. The power rail state signal 326 may indicate to the cache lowest power mode controller 306 whether to switch the cache memory to the processor power rail 314 from the memory power rail 312 for a lowest power mode of the processor 330. To generate the power rail state signal 326, the cache power switch 308 may determine from the comparison whether the power on the processor power rail 314 exceeds the power on the memory power rail 312 If the power on the processor power rail 314 exceeds the power on the memory power rail 312, this may correlate to a power rail state indicating to the cache lowest power mode controller 306 to ignore the output of the power rail state signal 326 that is output by the cache power switch 308, because the cache memory 310 may already be electrically connected to the processor power rail 314. In some embodiments, when the processor 330 is in an operating mode, the cache lowest power mode controller 306 may be inactive and/or bypassed, and the cache power switch controller 304 may receive the power rail state signal 326, which may correlate to a power rail state indicating to the cache power switch controller 304 that it should switch the cache memory to the processor power rail 314. If the cache power switch 308 determines from the comparison that the power on the processor power rail 314 does not exceed the power on the memory power rail 312, this may correlate to a power rail state indicating to the cache lowest power mode controller 306 that it should switch the cache memory to the processor power rail 314. The cache power switch 308 may output the power rail state signal 326 to the cache lowest power mode controller 306. In some embodiments, the cache power switch 308 may output the power rail state signal 326 to the cache lowest power mode controller 306 via the processor 330. In some embodiments, when the processor 330 is in an operating mode, the cache lowest power mode controller 306 may be inactive and/or bypassed, and the cache power switch controller 304 may receive the power rail state signal 326, which may correlate to a power rail state indicating to the cache power switch controller 304 that it should switch the cache memory to the memory power rail 312.

The processor 330 may also be configured to generate and output a wait mode signal 328 configured to indicate to the cache lowest power mode controller 306 that the processor 330 may enter a low power mode. The processor 330 may be configured to determine when to generate and output the wait mode signal 328 through various known means. For example, the processor 330 may be informed of or calculate wait times between processes for the processor 330 based on various factors, such as process scheduling and dependencies, and the processor 330 may use the wait times to determine when to generate and output the wait mode signal 328. The processor 330 may output the wait mode signal 328 to the cache lowest power mode controller 306.

The processor power manager 302 may be a processing device configured to control the power modes of the processor 330. The processor power manager 302 may generate and output a low power mode signal 318 to the cache lowest power mode controller 306 indicating a low power mode for the processor 330, and generate and output a wakeup signal 320 to the cache lowest power mode controller 306 indicating return to an operating power mode for the processor 330 from a low power mode. The processor power manager 302 may determine a power mode for the processor 330 through various known means. For example, the processor power manager 302 may be informed of or calculate wait times between processes for the processor 330 based on various factors, such as process scheduling and dependencies, and use the wait times to determine in which of the low power modes to place the processor 330. The processor power manager 302 may place the processor 330 into a low power mode from an operating power mode and/or from another low power mode. Longer wait times may trigger the processor power manager 302 to place the processor 330 into lower power modes. The processor power manager 302 may output a low power mode signal 318 to the cache lowest power mode controller 306 indicating the low power mode for the processor 330 selected by the processor power manager 302. In some embodiments, the low power mode signal 318 may indicate to the cache lowest power mode controller 306 a lowest power mode for the processor 330. For further example, the power manager 302 may use an expiring wait time and/or other factors, such as interrupts and/or events, to determine when to wake up the processor 330 by placing the processor 330 into an operating power mode from a low power mode. The processor power manager 302 may output a wakeup signal 320 to the cache lowest power mode controller 306 indicating an exit of a low power mode to an operating power mode for the processor 330.

The cache lowest power mode controller 306 may be a processing device configured to control selection of a power rail 312, 314 to power the cache memory 310 for a lowest power mode of the processor 330. The cache lowest power mode controller 306 may receive the power rail state signal 326 from the cache power switch 308, the wait mode signal 328 from the processor 330, the low power mode signal 318 from the processor power manager 302, and/or the wakeup signal 320 from the processor power manager 302.

The cache lowest power mode controller 306 may interpret various combinations of the received signals 318, 320, 326, 328 to determine whether to assert or deassert a lowest power mode switch control signal 322. Asserting the lowest power mode switch control signal 322 may indicate to the cache power switch 308 that the electrical connection of the cache memory should be switched 308 from the memory power rail 312 to the processor power rail 314. Asserting the lowest power mode switch control signal 322 may also indicate to the cache power switch 308 that it should maintain electrical connection of the cache memory 308 to the processor power rail 314. Deasserting the lowest power mode switch control signal 322 may indicate to the cache power switch 308 that the electrical connection of the cache memory should be switched 308 from the processor power rail 314 to the memory power rail 312. Deasserting the lowest power mode switch control signal 322 may also indicate to the cache power switch 308 that is should maintain the electrical connection of the cache memory 308 to the memory power rail 312.

In some embodiments, the lowest power mode switch control signal 322 may be relayed to the cache power switch 308 via the cache power switch controller 304, as described further herein. In some embodiments, the lowest power mode switch control signal 322 may be a digital signal, and asserting or deasserting the lowest power mode switch control signal 322 may be associated with an edge of the digital signal. For example, asserting the lowest power mode switch control signal 322 may be associated with a rising edge of the digital signal and deasserting the lowest power mode switch control signal 322 may be associated with a falling edge of the digital signal. In some embodiments, the lowest power mode switch control signal 322 may be a value stored to a register by the cache lowest power mode controller 306. In some embodiments, the lowest power mode switch control signal 322 may be an addressed message output to a shared communication bus by the cache lowest power mode controller 306.

In some embodiments, the power rail state signal 326 may indicate to the cache lowest power mode controller 306 that it should switch to the power rail 314 when the processor power rail 314 does not exceed the memory power rail 312. If processor power rail 314 exceeds memory power rail 312, then the cache memory 310 may already be electrically connected to the processor power rail 314 and there may not be a need to perform a switch to the processor power rail 314.

The cache lowest power mode controller 306 may assert the lowest power mode switch control signal 322 in response to receiving the low power mode signal 318 indicating to the cache lowest power mode controller 306 a lowest power mode for the processor 330, the power rail state signal 326 indicating to the cache lowest power mode controller 306 that it should switch to the power rail 314, and the wait mode signal 328. The cache lowest power mode controller 306 may not assert the lowest power mode switch control signal 322, or the lowest power mode switch control signal 322 may remain deasserted, in response to receiving any other combination of the low power mode signal 318, the power rail state signal 326, and/or the wait mode signal 328. The cache lowest power mode controller 306 may deassert the lowest power mode switch control signal 322 in response to receiving the wakeup signal 320 while the lowest power mode switch control signal 322 is asserted. The lowest power mode switch control signal 322 may be asserted by the cache lowest power mode controller 306 for the processor 330 entering the lowest power mode and deasserted by the cache lowest power mode controller 306 for the processor 330 exiting the lowest power mode. The lowest power mode switch control signal 322 may remain asserted as long as the processor 330 is in the lowest power mode and deasserted as long as the processor 330 is not in the lowest power mode.

The cache power switch controller 304 may be a processing device configured to control selection of a power rail 312, 314 for electrical connection to the cache memory 310. The cache power switch controller 304 may receive signals from various sources (not shown for clarity and simplicity), including the lowest power mode switch control signal 322 from the cache lowest power mode controller 306. The cache power switch controller 304 may interpret various signals to determine whether to generate and output a switch selection control signal 324. The switch selection control signal 324 may be a signal configured to indicate to the cache power switch 308 which of the power rails 312, 314 to electrically connect to the cache memory 310. The switch selection control signal 324 may be any format of signal, such as a digital signal represented by a high or low voltage and/or a rising or trailing edge to a dedicated pin of the processor, a value stored in a register that can be retrieved by the cache power switch controller 304 or the cache power switch 308, and/or an addressed message on a shared communication bus.

As discussed herein, the cache memory 310 may be electrically connected to the memory power rail 312 for some nominal operating power modes of the processor 330 and to the processor power rail 314 for elevated operating power modes of the processor 330. The cache power switch controller 304 may interpret various signals to generate and output the switch selection control signal 324 to indicate to the cache power switch 308 which of the power rails 312, 314 to electrically connect to the cache memory 310 for various operating power modes. Similarly, the cache memory 310 may be electrically connected to the memory power rail 312 for various low power modes of the processor 330. The cache power switch controller 304 may interpret various signals to generate and output the switch selection control signal 324 to control the cache power switch 308 to electrically connect the cache memory 310 to the memory power rail 312 for various low power modes. The cache memory 310 may be electrically connected to the processor power rail 314 for the lowest power mode of the processor 330.

In response to receiving the asserted lowest power mode switch control signal 322, the cache power switch controller 304 may generate and output the switch selection control signal 324 to control the cache power switch 308 to electrically connect the processor power rail 314 to the cache memory 310 for the lowest power mode of the processor 330. In response to receiving the deasserted lowest power mode switch control signal 322 or no longer receiving the asserted lowest power mode switch control signal 322, the cache power switch controller 304 may generate and output the switch selection control signal 324 causing the cache power switch 308 to electrically connect the memory power rail 312 to the cache memory 310 for the processor 330 exiting the lowest power mode.

The logic power rail 316 may be electrically connected to the processor power manager 302, the cache power switch controller 304, and the cache lowest power mode controller 306. The logic power rail 316 may transmit power from the PMIC 300 to the processor power manager 302, the cache power switch controller 304, and the cache lowest power mode controller 306. The logic power rail 316 may power the processor power manager 302, the cache power switch controller 304, and the cache lowest power mode controller 306 regardless of the power mode of the processor 330.

FIG. 3 illustrates an example cache memory power control system having a single processor 330. The PMIC may power-collapse the processor power rail 314 for the processor 330 entering the lowest power mode of the processor 330, and power the processor power rail 314 for the processor 330 exiting the lowest power mode. The cache lowest power mode controller 306 may receive the power rail state signal 326 from the cache power switch 308 and the wait mode signal 328 from the processor 330. The cache lowest power mode controller 306 may interpret the power rail state signal 326 and the wait mode signal 328, along with other received signals as discussed herein, to determine whether to assert or deassert the lowest power mode switch control signal 322. In response to receiving the asserted or deasserted lowest power mode switch control signal 322, or not receiving the asserted lowest power mode switch control signal 322, the cache power switch controller 304 may generate and output the switch selection control signal 324 to indicate to the cache power switch 308 which power rail 312, 314 to electrically connect to the cache memory 310.

FIG. 4 illustrates an example cache memory power control system having multiple processors 330 having a shared memory power rail 312 and a shared processor power rail 314. In some embodiments, the multiple processors 330 may be individual processors 330. In some embodiments, the multiple processors 330 may be any number of clusters of processors. The PMIC may power-collapse the processor power rail 314 for all of the processors 330 entering the lowest power mode of the processor 330, and power the processor power rail 314 for at least one of the processor 330 exiting the lowest power mode. The cache lowest power mode controller 306 may receive the power rail state signal 326 from the cache power switch 308 and the wait mode signal 328 from each of the processors 330 separately. As described herein, the cache lowest power mode controller 306 may interpret the power rail state signal 326 and the wait mode signal 328, along with other received signals for each of the processors 330, to determine whether to assert or deassert the lowest power mode switch control signal 322 for each of the processors 330 separately. In response to receiving the asserted or deasserted lowest power mode switch control signal 322 for a specific processor 330, or not receiving the asserted lowest power mode switch control signal 322 for the specific processor 330, the cache power switch controller 304 may generate and output the switch selection control signal 324 to indicate to the cache power switch 308 of the specific processor 330 which power rail 312, 314 to electrically connect to the cache memory 310 of the specific processor 330.

In some embodiments, the multiple processors 330 may be a cluster of processors. The PMIC 300 may power-collapse the processor power rail 314 for all of the processors 330 entering the lowest power mode of the processor 330, and power the processor power rail 314 for at least one of the processor 330 exiting the lowest power mode. The cache lowest power mode controller 306 may receive the power rail state signal 326 from the cache power switch 308 and the wait mode signal 328 from each of the processors 330 separately. As described herein, the cache lowest power mode controller 306 may interpret the power rail state signal 326 and the wait mode signal 328, along with other received signals for each of the processors 330, to determine whether to assert or deassert the lowest power mode switch control signal 322 for all of the processors 330 in the cluster. The cache lowest power mode controller 306 may assert the lowest power mode switch control signal 322 in response to determining that all of the processors 330 of the cluster are entering the lowest power mode and the power rail state signal 326 indicating to the cache lowest power mode controller 306 that the power on the processor rail 314 does not exceed the power on the memory rail 312. The cache lowest power mode controller 306 may deassert the lowest power mode switch control signal 322 in response to determining that at least one of the processors 330 of the cluster is exiting the lowest power mode. In response to receiving the asserted or deasserted lowest power mode switch control signal 322, or not receiving the asserted lowest power mode switch control signal 322, the cache power switch controller 304 may generate and output the switch selection control signal 324 to indicate to the cache power switch 308 which power rail 312, 314 to electrically connect to the cache memory 310 for all of the processors 330 in the cluster.

FIG. 5 illustrates an example cache memory power control system having multiple processors 330 having a shared memory power rail 312 and dedicated processor power rails 314. In some embodiments, the multiple processors 330 may be individual processors 330. In some embodiments, the multiple processors 330 may be any number of clusters of processors. The PMIC may power-collapse each of the processor power rails 314 individually for each of the processors 330 entering the lowest power mode of the processor 330, and power each of the processor power rails 314 individually for each of the processors 330 exiting the lowest power mode. The cache lowest power mode controller 306 may receive the power rail state signal 326 from the cache power switch 308 and the wait mode signal 328 from each of the processors 330 separately. As described herein, the cache lowest power mode controller 306 may interpret the power rail state signal 326 and the wait mode signal 328, along with other received signals for each of the processors 330, to determine whether to assert or deassert the lowest power mode switch control signal 322 for each of the processors 330 separately. In response to receiving the asserted or deasserted lowest power mode switch control signal 322 for a specific processor 330, or not receiving the asserted lowest power mode switch control signal 322 for the specific processor 330, the cache power switch controller 304 may generate and output the switch selection control signal 324 to indicate to the cache power switch 308 of the specific processor 330 which power rail 312, 314 to electrically connect to the cache memory 310 of the specific processor 330.

Figure 6:
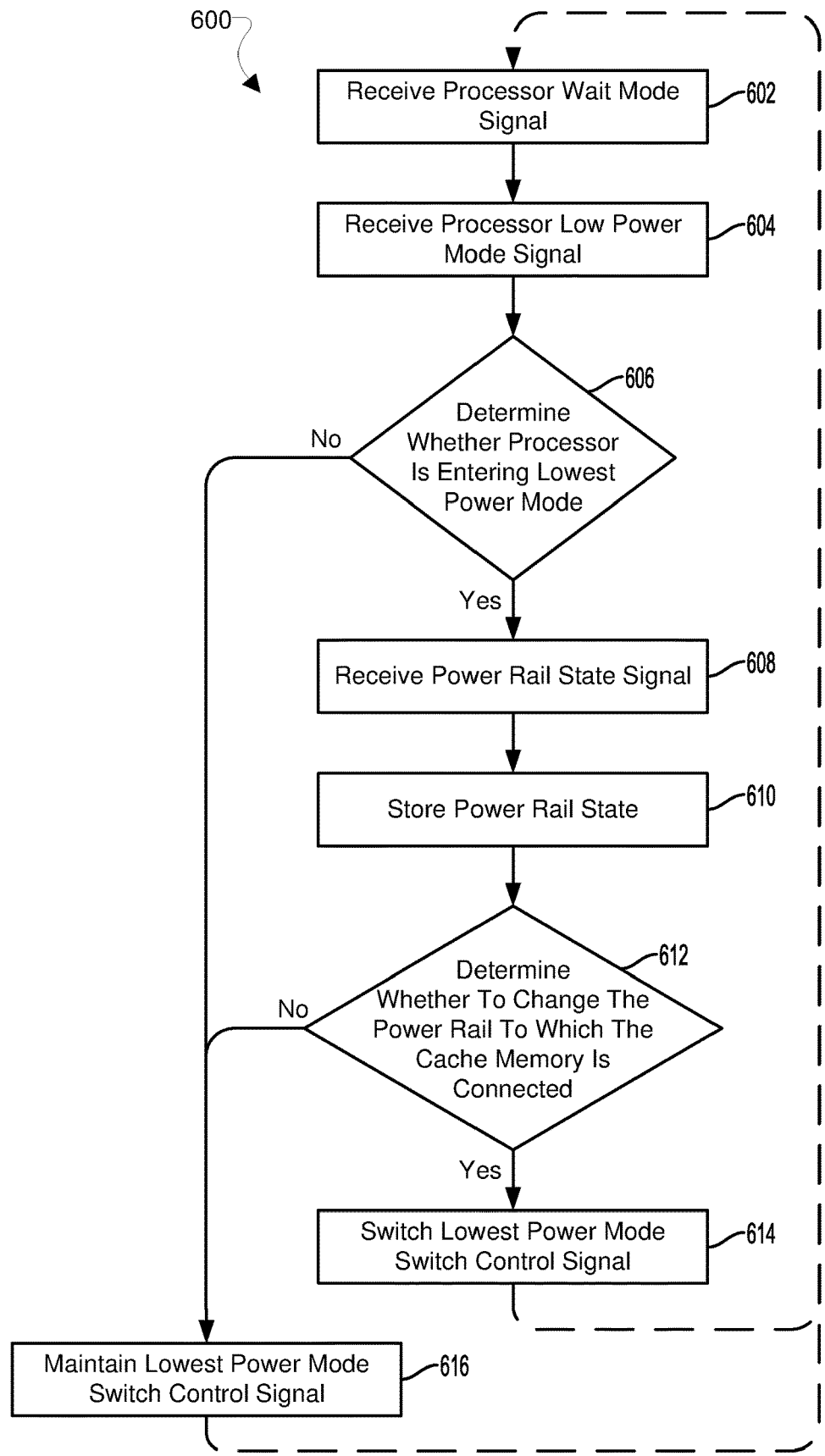
FIG. 6 is a process flow diagram illustrating a method for cache memory power control entering a lower power mode according to an embodiment.

As illustrated in FIGS. 3-5, a cache memory power control system may include any number and combination of processor power rails 314 and processors 330 along with associated cache memory 310. In various embodiments, a cache memory power control system may include any number of processor power managers 302, cache power switch controllers 304, and/or cache lowest power mode controllers 306. For example, some embodiments of a cache memory power control system may include a processor power manager 302, a cache power switch controller 304, and/or a cache lowest power mode controller 306 for each processor 330 or cluster of processors. FIGS. 3-5 illustrate various embodiments that are meant to be illustrative examples and not limiting of the scope of the claims FIG. 6 illustrates a method 600 for cache memory power control entering a lower power mode according to an embodiment. With reference to FIGS. 1-6, the method 600 may be implemented in a computing device (e.g., computing device 10 in FIG. 1), in software executing in a processor (e.g., processor 14, 200, 201, 202, 204 in FIGS. 1 and 2, processor power manager 302, cache power switch controller 304, cache lowest power mode controller 306 in FIGS. 3-5), in general purpose hardware, in dedicated hardware (e.g., processor power manager 302, cache power switch controller 304, cache lowest power mode controller 306, cache power switch 308 in FIGS. 3-5), or in a combination of a software-configured processor and dedicated hardware, such as a processor executing software within a memory power control system that includes other individual components (e.g., memory 16, 24 illustrated in FIG. 1, cache memory 210, 212, 214, 216, 220, 222, 230, 240 illustrated in FIG. 2), and various memory/cache controllers. In order to encompass the alternative configurations enabled in various embodiments, the hardware implementing the method 600 is referred to herein as a "cache lowest power mode controller."

In block 602, the cache lowest power mode controller may receive a processor wait mode signal. The wait mode signal may be configured to indicate to a cache lowest power mode controller whether a processor is entering a wait mode. The cache lowest power mode controller may receive the wait mode signal from the processor.

In block 604, the cache lowest power mode controller may receive a processor low power mode signal. The processor low power mode signal may be configured to indicate to the cache lowest power mode controller a specific low power mode of the processor that the processor may be entering or in. The processor low power mode signal may indicate to the cache lowest power mode controller any of the low power modes of the processor, including a lowest power mode of the processor. The cache lowest power mode controller may receive the low power mode signal from the processor power manager.

In determination block 606, the cache lowest power mode controller may determine whether the processor is entering the lowest power mode of the processor. The cache lowest power mode controller may interpret the low power mode indicated by the received low power mode signal. In response to interpreting that the low power mode signal indicates the lowest power mode of the processor, the cache lowest power mode controller may determine that the processor is entering the lowest power mode of the processor. In response to interpreting that the low power mode signal indicates a low power mode other than the lowest power mode of the processor, the cache lowest power mode controller may determine that the processor is not entering the lowest power mode of the processor. In some embodiments, the cache lowest power mode controller may store the low power mode to a register of the cache lowest power mode controller or other memory accessible by the cache lowest power mode controller. In some embodiments, the cache lowest power mode controller may set a flag in a register of the cache lowest power mode controller, or other memory accessible by the cache lowest power mode controller, in response to the lowest power mode being indicated by received low power mode signal. In some embodiments, the cache lowest power mode controller may determine that the processor is entering the lowest power mode of the processor in response to receiving the wait mode signal in block 602 and interpreting that the low power mode signal, received in block 604, indicates the lowest power mode of the processor.

In response to determining that the processor is entering the lowest power mode of the processor (i.e., determination block 606="Yes"), the cache lowest power mode controller may receive a power rail state signal in block 608. The power rail state signal may be configured to indicate to the cache lowest power mode controller a power rail state. The power rail state may indicate to the cache lowest power mode controller whether the cache memory is electrically connected, via a cache power switch, to a memory power rail or to a processor power rail of the processor for the lowest power mode of the processor. The cache lowest power mode controller may receive the power rail state signal from the cache power switch, for example, via the processor.

In block 610, the cache lowest power mode controller may store the power rail state. The power rail state, indicated to the cache lowest power mode controller by the received power rail state signal, may be the power rail state for a lowest power mode entry for the processor. The power rail state signal may be received following a determination that the processor is entering the lowest power mode of the processor in determination block 606. The cache lowest power mode controller may store the power rail state to a register of the cache lowest power mode controller or other memory accessible by the cache lowest power mode controller.

In determination block 612, the cache lowest power mode controller may determine whether to change the power rail to which the cache memory is connected based on the power rail state. Thus, in response to determining that the processor is entering the lowest power mode (i.e., determination block 606="Yes"), the cache lowest power mode controller may interpret the power rail state and determine based on the power rail state whether the cache memory should be switched to the processor power rail from the memory power rail. In determination block 612 the cache lowest power mode controller may determine whether the power rail state indicates that the cache memory is connected to the memory power rail or to the processor memory rail. The cache lowest power mode controller may determine that the cache memory should be switched to the processor memory rail in response to determining that the power rail state indicates that the cache memory is connected to the memory power rail. Similarly, the cache lowest power mode controller may determine that the power rail to which the cache memory is connected should not be switched, thus leaving the power rail connection of the cache memory unchanged, in response to determining that the power rail state indicates that the cache memory is connected to the processor power rail.

In response to determining that the power rail connection for the cache memory should be switched to the processor power rail for the lowest power mode of the processor (i.e., determination block 612="Yes"), the cache lowest power mode controller may switch a lowest power mode switch control signal in block 614. The cache lowest power mode controller may assert or deassert the lowest power mode switch control signal depending upon an implementation. In some embodiments, asserting the lowest power mode switch control signal may indicate to a cache power switch controller that the electrical connection of the cache memory should be switched from the memory power rail to the processor power rail, and deasserting the lowest power mode switch control signal may indicate to the cache power switch that the electrical connection of the cache memory should be switched from the processor power rail to the memory power rail. In some embodiments, the indication to the cache power switch of asserting or deasserting the lowest power mode switch control signal may be reversed. Regardless of the configuration of the lowest power mode switch control signal, the cache lowest power mode controller may switch asserting or deasserting the lowest power mode switch control signal to indicate to the cache power switch that the electrical connection of the cache memory should be switched from the memory power rail to the processor power rail. The cache lowest power mode controller may optionally return to receiving a processor wait mode signal in block 602.

In response to determining that the processor is not entering the lowest power mode of the processor (i.e., determination block 606="No") or in response to determining that the power rail to which the cache memory is connected should not be changed (i.e., determination block 612="No"), the cache lowest power mode controller may maintain the lowest power mode switch control signal in block 616. As a result of maintaining the lowest power mode switch control signal, the cache power switch will maintain (i.e., not change) the current power rail connection of the cache memory. As long as the processor is not entering, is no longer in the process of entering, or is exiting the lowest power mode, the cache lowest power mode controller may maintain asserting or deasserting the lowest power mode switch control signal. The cache lowest power mode controller may optionally return to receiving a processor wait mode signal in block 602.

Figure 7:
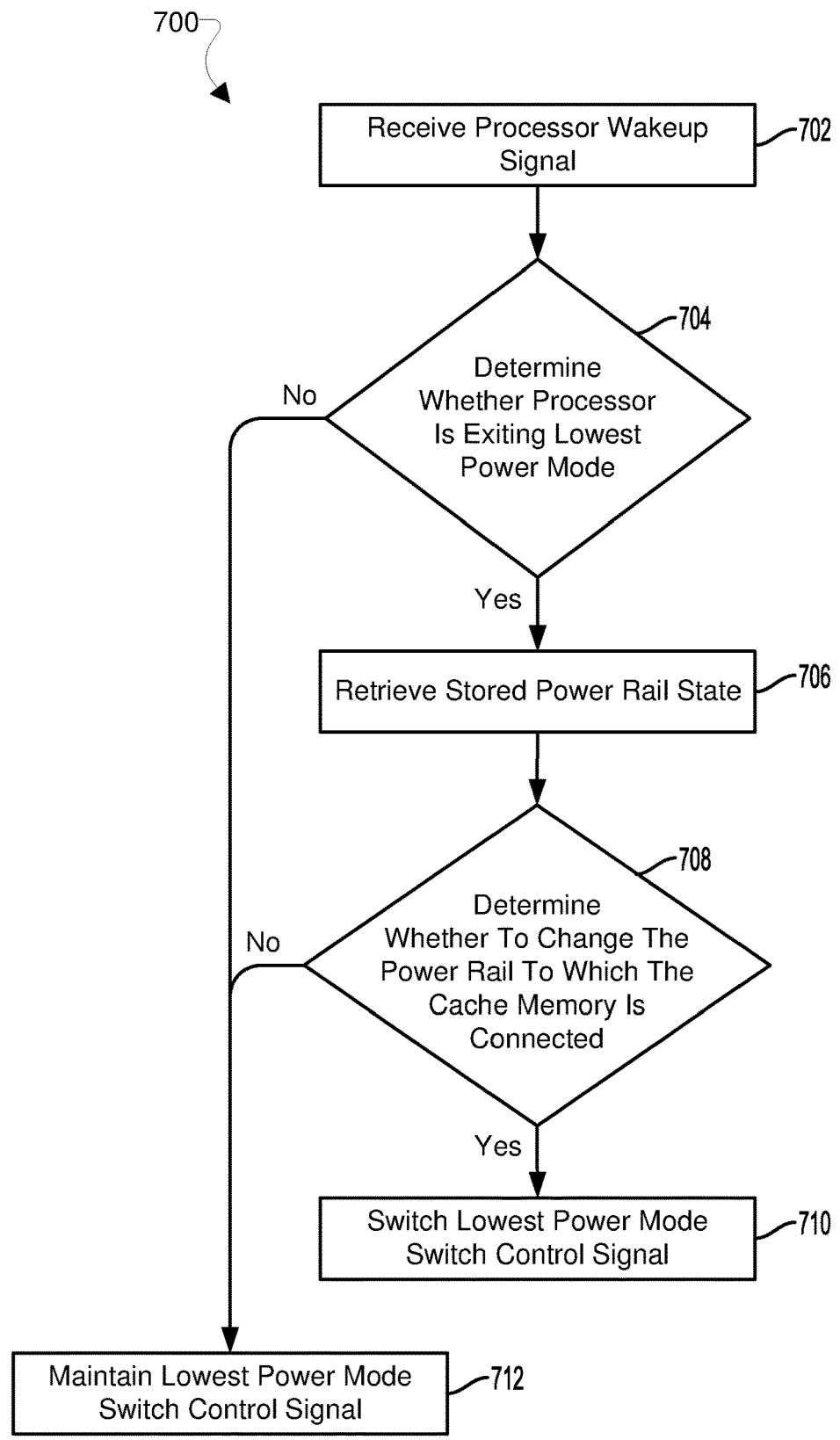
FIG. 7 is a process flow diagram illustrating a method for cache memory power control exiting a lowest power mode according to an embodiment.

FIG. 7 illustrates a method 700 for cache memory power control exiting a lowest power mode according to an embodiment. With reference to FIGS. 1-7, the method 700 may be implemented in a computing device (e.g., computing device 10 in FIG. 1), in software executing in a processor (e.g., processor 14, 200, 201, 202, 204 in FIGS. 1 and 2, processor power manager 302, cache power switch controller 304, cache lowest power mode controller 306 in FIGS. 3-5), in general purpose hardware, in dedicated hardware (e.g., processor power manager 302, cache power switch controller 304, cache lowest power mode controller 306, cache power switch 308 in FIGS. 3-5), or in a combination of a software-configured processor and dedicated hardware, such as a processor executing software within a memory power control system that includes other individual components (e.g., memory 16, 24 illustrated in FIG. 1, cache memory 210, 212, 214, 216, 220, 222, 230, 240 illustrated in FIG. 2), and various memory/cache controllers. In order to encompass the alternative configurations enabled in various embodiments, the hardware implementing the method 700 is referred to herein as a "cache lowest power mode controller."

In block 702, the cache lowest power mode controller may receive a signal configured to indicate that a processor is exiting a low power mode of a processor, including a lowest power mode of the processor. In some embodiments, the cache lowest power mode controller may receive a processor wakeup signal. The wakeup signal may indicate to the cache lowest power mode controller whether a processor is exiting a low power mode of a processor, including a lowest power mode of the processor. The cache lowest power mode controller may receive the wakeup signal from a processor power manager.

In determination block 704, the cache lowest power mode controller may determine whether the processor is exiting the lowest power mode of the processor based in part on the signal received in block 702. In some embodiments, the cache lowest power mode controller may determine whether the processor is exiting the lowest power mode by a combination of receiving the processor wakeup signal in block 702, and switching and/or maintaining the lowest power mode switch control signal in blocks 614 and 616 of the method 600 with reference to FIG. 6. In other words, a combination of the cache lowest power mode controller receiving the processor wakeup signal and signaling that the electrical connection of the cache memory should be switched from a memory power rail to a processor power rail may indicate to the cache lowest power mode controller that the processor is exiting the lowest power mode. In some embodiments, the cache lowest power mode controller may determine whether the processor is exiting the lowest power mode based on a combination of receiving the processor wakeup signal in block 702 and retrieving a stored low power mode, such as stored as part of block 604 of the method 600 with reference to FIG. 6, which indicates a lowest power mode to the cache lowest power mode controller.

In response to determining that the processor is exiting the lowest power mode of the processor (i.e., determination block 704="Yes"), the cache lowest power mode controller may retrieve a stored power rail state in block 706. The cache lowest power mode controller may retrieve the stored power rail state from the register or other memory accessible by the cache lowest power mode controller to which the cache lowest power mode controller stored the power rail state in block 610 of the method 600 described with reference to FIG. 6.

In determination block 708, the cache lowest power mode controller may determine whether to change the power rail to which the cache memory is connected based at least in part on the stored power rail state. The cache lowest power mode controller may interpret the power rail state and determine whether the power rail state indicates switching to the processor power rail or maintaining the electrical connection of the cache memory to the processor power rail. For example, if the stored power rail state (i.e., the power rail state received in block 608 and stored in block 610 of the method 600) indicates that the cache memory was connected to the memory power rail before or at the time the processor entered the low power mode, the cache lowest power mode controller may determine that the power rail to which the cache memory is connected should be changed, that is from being connected to the processor power rail to being connected to the memory power rail. On the other hand, if the stored power rail state indicates that the cache memory was connected to the processor power rail before or at the time the processor entered the low power mode, the cache lowest power mode controller may determine that the power rail to which the cache memory is connected should not be changed.

In response to determining that the power rail to which the cache memory is connected based at least in part on the stored power rail state (i.e., determination block 708="Yes"), the cache lowest power mode controller may switch a lowest power mode switch control signal in block 710. The cache lowest power mode controller may assert or deassert the lowest power mode switch control signal. In some embodiments, asserting the lowest power mode switch control signal may indicate to a cache power switch that the electrical connection of the cache memory should be switched from the memory power rail to the processor power rail, and deasserting the lowest power mode switch control signal may indicate to the cache power switch that the electrical connection of the cache memory should be switched from the processor power rail to the memory power rail. In some embodiments, the indication to the cache power switch by asserting or deasserting the lowest power mode switch control signal may be reversed. Regardless of the configuration of the lowest power mode switch control signal, the cache lowest power mode controller may switch asserting or deasserting the lowest power mode switch control signal to indicate to the cache power switch that the electrical connection of the cache memory should be switched from the processor power rail to the memory power rail. In some embodiments, the switching, either asserting or deasserting, of the lowest power mode switch control signal may be the opposite of the lowest power mode switch control signal output in block 614 of the method 600 (FIG. 6).

In response to determining that the processor is not exiting the lowest power mode of the processor (i.e., determination block 704="No"); or in response to determining that the power rail to which the cache memory is connected should not be changed (i.e., determination block 708="No"), the cache lowest power mode controller may maintain (i.e., continue asserting or deasserting) the lowest power mode switch control signal in block 712. As a result of maintaining the lowest power mode switch control signal, the cache power switch will maintain (i.e., not change) the current power rail connection of the cache memory.

Figure 8:
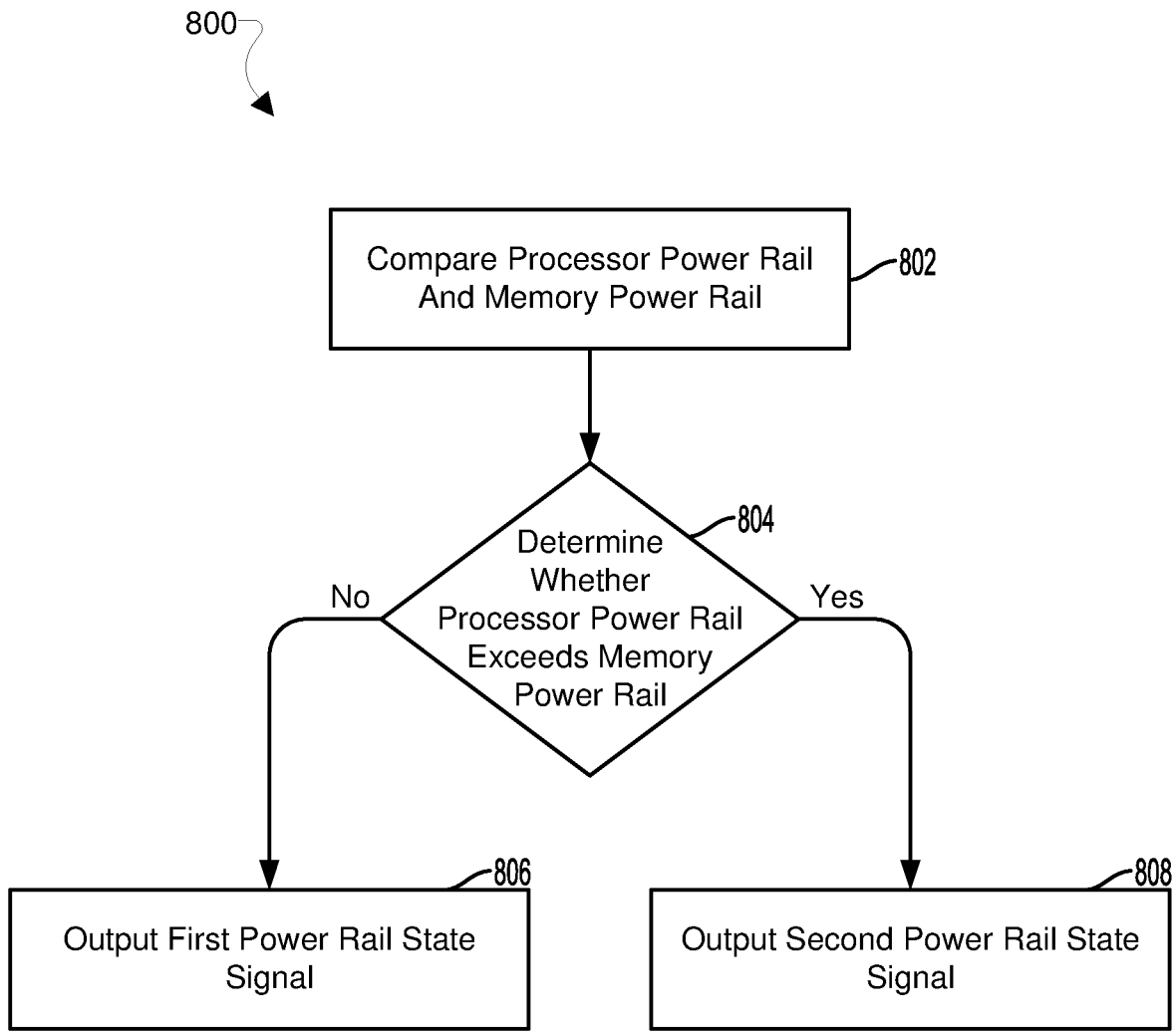
FIG. 8 is a process flow diagram illustrating a method for cache memory power control entering a lower power mode according to an embodiment.

FIG. 8 illustrates a method 800 for determining an appropriated power rail state signal to output to a cache lowest power mode controller according to an embodiment. With reference to FIGS. 1-8, the method 800 may be implemented in a computing device (e.g., computing device 10 in FIG. 1), in software executing in a processor (e.g., processor 14, 200, 201, 202, 204 in FIGS. 1 and 2, processor power manager 302, cache power switch controller 304, cache lowest power mode controller 306 in FIGS. 3-5), in general purpose hardware, in dedicated hardware (e.g., processor power manager 302, cache power switch controller 304, cache lowest power mode controller 306, cache power switch 308 in FIGS. 3-5), or in a combination of a software-configured processor and dedicated hardware, such as a processor executing software within a memory power control system that includes other individual components (e.g., memory 16, 24 illustrated in FIG. 1, cache memory 210, 212, 214, 216, 220, 222, 230, 240 illustrated in FIG. 2), and various memory/cache controllers. In order to encompass the alternative configurations enabled in various embodiments, the hardware implementing the method 800 is referred to herein as a "processing device."

In block 802, the processing device may compare a processor power rail and a memory power rail. A cache power switch may selectively electrically connect a cache memory to the processor power rail and the memory power rail. The cache power switch may compare the voltages of the processor power rail and the memory power rail.

In determination block 804, the processing device may determine whether the voltage on the processor power rail exceeds the voltage on the memory power rail. From the comparison of the voltages of the processor power rail and the memory power rail in block 802, the cache power switch may determine whether the voltage of the processor power rail exceeds the voltage of the memory power rail.

In response to determining that the voltage on the processor power rail does not exceed that of the memory power rail (i.e., determination block="No"), the processing device may output a first power rail state signal in block 806. The cache power switch may generate and output to a cache power switch controller or to a cache lowest power mode controller the first power rail state signal associated with the voltage of the processor power rail not exceeding the voltage of the memory power rail. When the processor is in an operating mode, the first power rail state signal may indicate to the cache power switch controller to select the memory power rail to electrically connect to the cache memory. When the processor is in a low power mode, the first power rail state signal may indicate to the cache lowest power mode controller that the power rail electrically connected to the cache memory is the memory power rail and to switch electrical connection of the cache memory to the processor power rail for the lowest power mode of the processor.

In response to determining that the voltage on the processor power rail exceeds that of the memory power rail (i.e., determination block="Yes"), the processing device may output a second power rail state signal in block 808. The cache power switch may generate and output to the cache power switch controller the second power rail state signal associated with the voltage of the processor power rail exceeding the voltage of the memory power rail. When the processor is in an operating mode, the second power rail state signal may indicate to the cache power switch controller to select the processor power rail to electrically connect to the cache memory. When the processor is in a low power mode, the second power rail state signal may indicate to the cache lowest power mode controller that the power rail electrically connected to the cache memory is the processor power rail and to maintain an electrical connection to the processor power rail for the lowest power mode of the processor.

Figure 9:
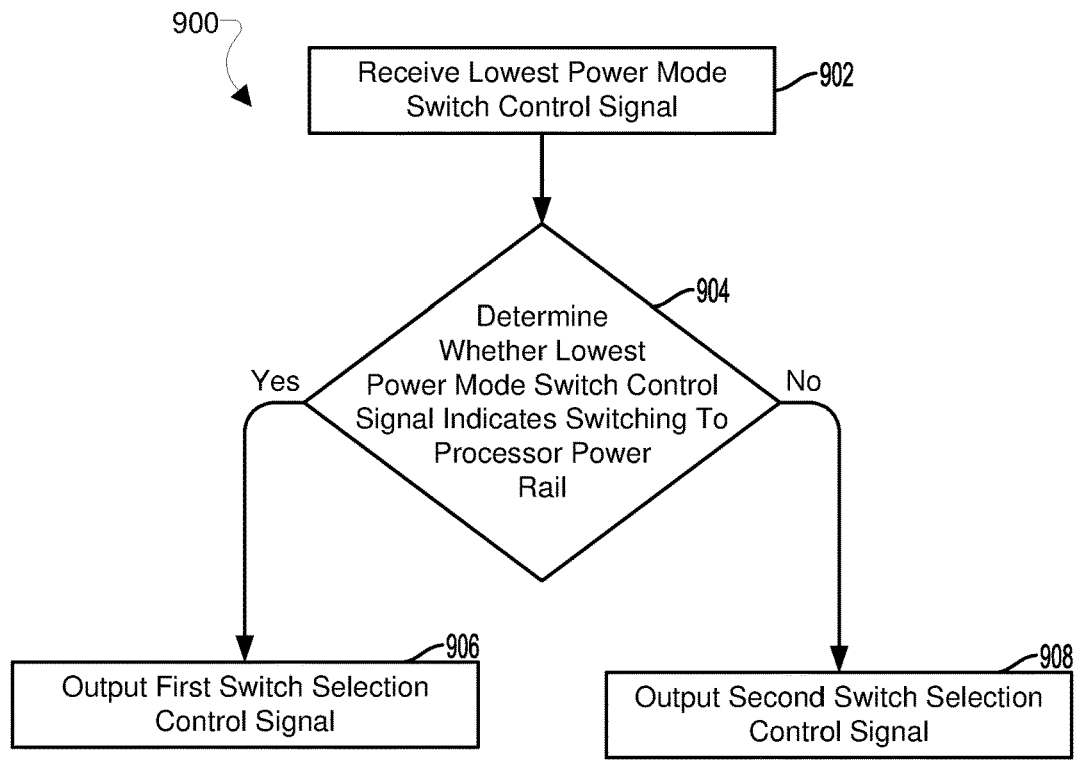
FIG. 9 is a process flow diagram illustrating a method for cache memory power control according to an embodiment.

FIG. 9 illustrates a method 900 for a cache power switch controller determining how to control a cache power switch according to an embodiment. With reference to FIGS. 1-9, the method 900 may be implemented in a computing device (e.g., computing device 10 in FIG. 1), in software executing in a processor (e.g., processor 14, 200, 201, 202, 204 in FIGS. 1 and 2, processor power manager 302, cache power switch controller 304, cache lowest power mode controller 306 in FIGS. 3-5), in general purpose hardware, in dedicated hardware (e.g., processor power manager 302, cache power switch controller 304, cache lowest power mode controller 306, cache power switch 308 in FIGS. 3-5), or in a combination of a software-configured processor and dedicated hardware, such as a processor executing software within a memory power control system that includes other individual components (e.g., memory 16, 24 illustrated in FIG. 1, cache memory 210, 212, 214, 216, 220, 222, 230, 240 illustrated in FIG. 2), and various memory/cache controllers. In order to encompass the alternative configurations enabled in various embodiments, the hardware implementing the method 900 is referred to herein as a "cache power switch controller."

In block 902, the cache power switch controller may receive a lowest power mode switch control signal. A cache power switch controller may receive the lowest power mode switch control signal asserted or deasserted by a cache lowest power mode controller in blocks 614, 616, 710, 712 of the methods 600, 700 with reference to FIGS. 6 and 7.

In determination block 904, the cache power switch controller may determine whether the lowest power mode switch control signal indicates to the cache power switch controller that it should switch to a processor power rail for electrical connections to a cache memory for a lowest power mode of a processor. The cache power switch controller may be configured to interpret the lowest power mode switch control signal, including whether an asserted or a deasserted lowest power mode switch control signal indicates that the electrical connection of the cache memory of the processor should be switched from a memory power rail to the processor power rail.

In response to determining that the lowest power mode switch control signal indicates switching to the processor power rail for electrical connection to the cache memory for the lowest power mode of the processor (i.e., determination block 904="Yes"), the cache power switch controller may output a first switch selection control signal in block 906. When entering a lowest power mode of the processor, the cache power switch controller may generate and output a switch selection control signal indicating to a cache power switch of the processor that it should selectively electrically connect the processor power rail to the cache memory. When exiting a lowest power mode of the processor, the cache power switch controller may generate and output a switch selection control signal indicating to the cache power switch of the processor that it should selectively electrically connect the memory power rail to the cache memory.

In response to determining that the lowest power mode switch control signal indicates to the cache power switch controller should not switch to the processor power rail for electrical connection to the cache memory for the lowest power mode of the processor (i.e., determination block 904="No"), the cache power switch controller may output a second switch selection control signal in block 908. The cache power switch controller may generate and output a switch selection control signal indicating to the cache power switch that it should maintain the electrical connection of the power rail electrically connected to the cache memory.

Figure 10:
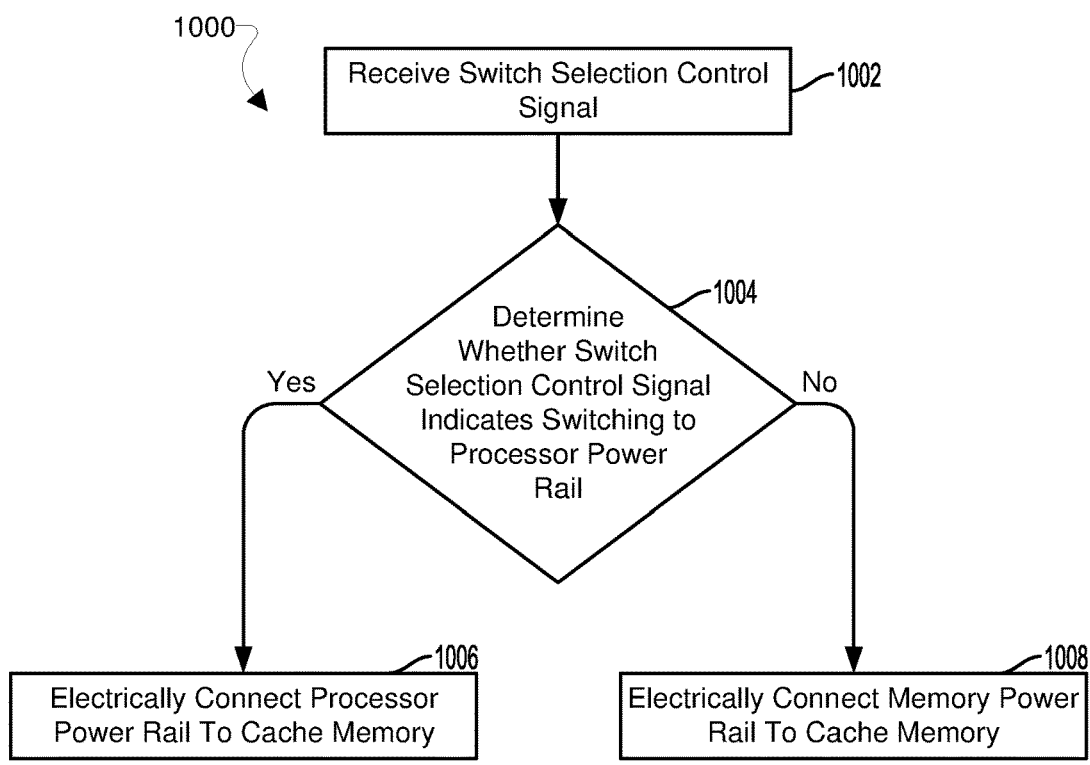
FIG. 10 is a process flow diagram illustrating a method for cache memory power control according to an embodiment.

FIG. 10 illustrates a method 1000 for a cache power switch to respond to signals from a cache power switch controller according to an embodiment. With reference to FIGS. 1-10, the method 1000 may be implemented in a computing device (e.g., computing device 10 in FIG. 1), in software executing in a processor (e.g., processor 14, 200, 201, 202, 204 in FIGS. 1 and 2, processor power manager 302, cache power switch controller 304, cache lowest power mode controller 306 in FIGS. 3-5), in general purpose hardware, in dedicated hardware (e.g., processor power manager 302, cache power switch controller 304, cache lowest power mode controller 306, cache power switch 308 in FIGS. 3-5), or in a combination of a software-configured processor and dedicated hardware, such as a processor executing software within a memory power control system that includes other individual components (e.g., memory 16, 24 illustrated in FIG. 1, cache memory 210, 212, 214, 216, 220, 222, 230, 240 illustrated in FIG. 2), and various memory/cache controllers. In order to encompass the alternative configurations enabled in various embodiments, the hardware implementing the method 1000 is referred to herein as a "cache power switch e."

In block 1002, the cache power switch may receive a switch selection control signal. A cache power switch may receive the switch selection control signal output by a cache power switch controller in blocks 906, 908 of the method 900 as described with reference to FIG. 9.

In determination block 1004, the cache power switch may determine whether the switch selection control signal indicates switching a processor power rail to electrically connect to a cache memory of a processor. The cache power switch may be configured to interpret whether the switch selection control signal indicates selectively electrically connecting the cache memory to a memory power rail or the processor power rail.

In response to determining that the switch selection control signal indicates the cache power switch selecting the processor power rail to electrically connect to the cache memory of the processor (i.e., determination block 1004="Yes"), the cache power switch may electrically connect the processor power rail to the cache memory in block 1006. The cache power switch may selectively control a switching element of the cache power switch to maintain or engage an electrical connection between the processor power rail and the cache memory. In some embodiments, to engage an electrical connection between the processor power rail and the cache memory the cache power switch may selectively control the same or another switching element of the cache power switch to disengage an electrical connection between the memory power rail and the cache memory.

In response to determining that the switch selection control signal does not indicate to the cache power switch that it should switch the processor power rail to electrically connect to the cache memory of the processor (i.e., determination block 1004="No"), the cache power switch may selectively electrically connect the memory power rail to the cache memory in block 1008. The cache power switch may selectively control a switching element of the cache power switch to maintain or engage an electrical connection between the memory power rail and the cache memory. In some embodiments, to engage an electrical connection between the memory power rail and the cache memory the cache power switch may selectively control the same or another switching element of the cache power switch to disengage an electrical connection between the processor power rail and the cache memory.

Figure 11:
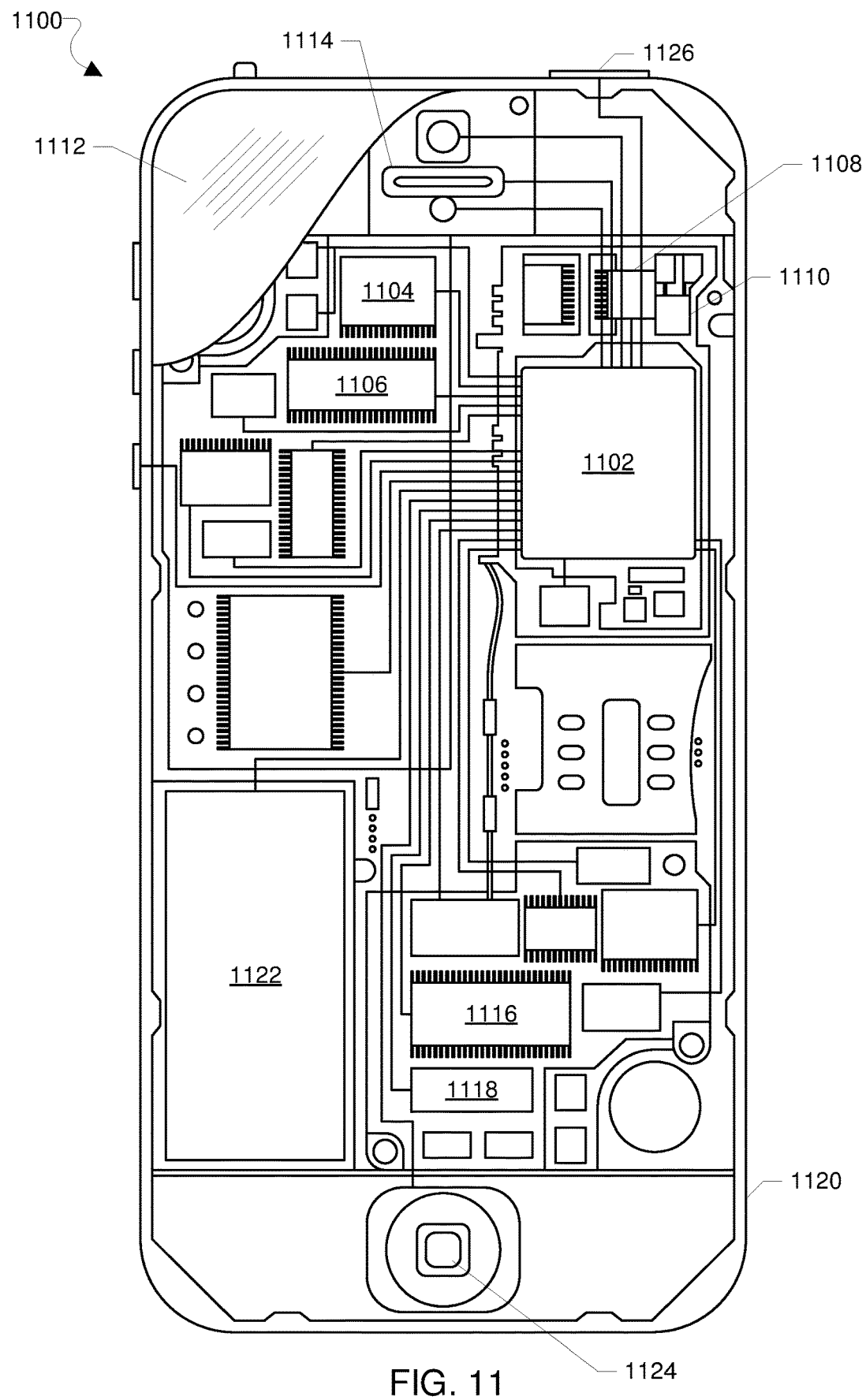
FIG. 11 is a component block diagram illustrating an example mobile computing device suitable for use with the various embodiments.

The various embodiments (including, but not limited to, embodiments described above with reference to FIGS. 1-10) may be implemented in a wide variety of computing systems including mobile computing devices, an example of which suitable for use with the various embodiments is illustrated in FIG. 11. The mobile computing device 1100 may include a processor 1102 coupled to a touchscreen controller 1104 and an internal memory 1106. The processor 1102 may be one or more multicore integrated circuits designated for general or specific processing tasks. The internal memory 1106 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1104 and the processor 1102 may also be coupled to a touchscreen panel 1112, such as a resistive-sensing touchscreen, capacitive-sensing touchscreen, infrared sensing touchscreen, etc. Additionally, the display of the mobile computing device 1100 need not have touch screen capability.

The mobile computing device 1100 may have one or more radio signal transceivers 1108 (e.g., Peanut, Bluetooth, Zig-Bee, Wi-Fi, RF radio) and antennae 1110, for sending and receiving communications, coupled to each other and/or to the processor 1102. The transceivers 1108 and antennae 1110 may be used with the above-mentioned circuitry to implement the various wireless transmission protocol stacks and interfaces. The mobile computing device 1100 may include a cellular network wireless modem chip 1116 that enables communication via a cellular network and is coupled to the processor.

The mobile computing device 1100 may include a peripheral device connection interface 1118 coupled to the processor 1102. The peripheral device connection interface 1118 may be singularly configured to accept one type of connection, or may be configured to accept various types of physical and communication connections, common or proprietary, such as Universal Serial Bus (USB), FireWire, Thunderbolt, or PCIe. The peripheral device connection interface 1118 may also be coupled to a similarly configured peripheral device connection port (not shown).

Figure 12:
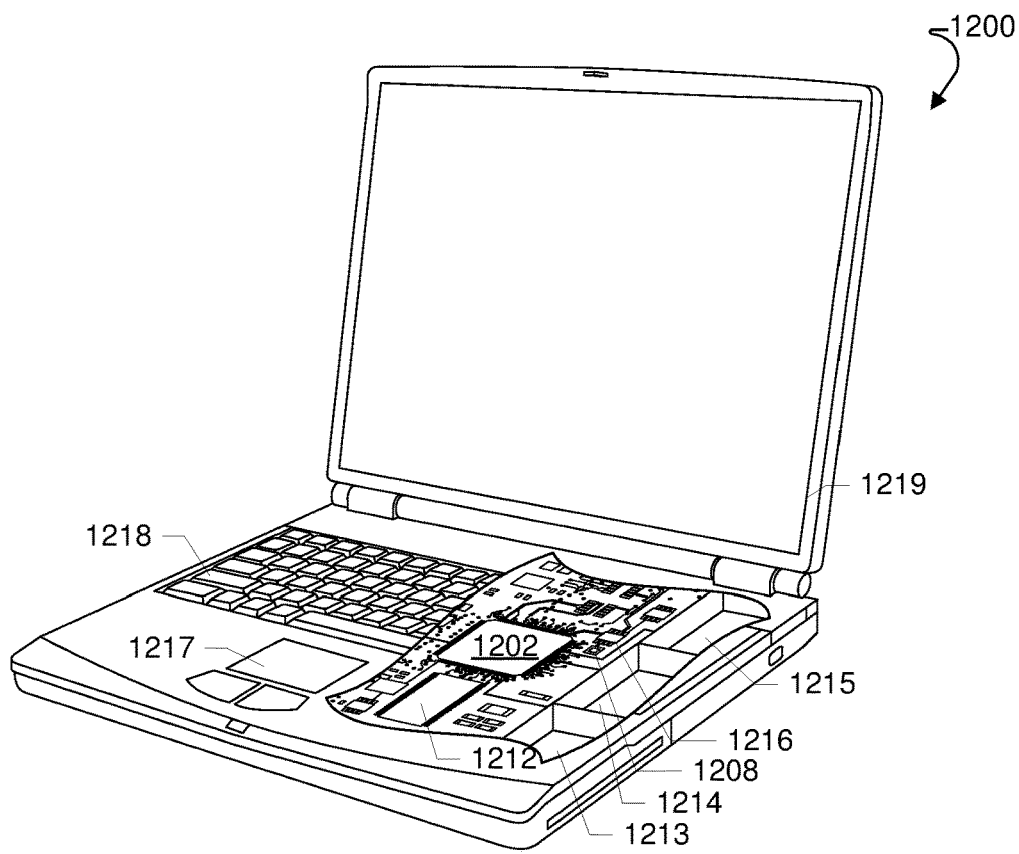
FIG. 12 is a component block diagram illustrating an example mobile computing device suitable for use with the various embodiments.

The mobile computing device 1100 may also include speakers 1114 for providing audio outputs. The mobile computing device 1100 may also include a housing 1120, constructed of a plastic, metal, or a combination of materials, for containing all or some of the components described herein. The mobile computing device 1100 may include a power source 1122 coupled to the processor 1102, such as a disposable or rechargeable battery. The rechargeable battery may also be coupled to the peripheral device connection port to receive a charging current from a source external to the mobile computing device 1100. The mobile computing device 1100 may also include a physical button 1124 for receiving user inputs. The mobile computing device 1100 may also include a power button 1126 for turning the mobile computing device 1100 on and off The various embodiments (including, but not limited to, embodiments described above with reference to FIGS. 1-10) may be implemented in a wide variety of computing systems include a laptop computer 1200 an example of which is illustrated in FIG. 12. Many laptop computers include a touchpad touch surface 1217 that serves as the computer's pointing device, and thus may receive drag, scroll, and flick gestures similar to those implemented on computing devices equipped with a touch screen display and described above. A laptop computer 1200 will typically include a processor 1202 coupled to volatile memory 1212 and a large capacity nonvolatile memory, such as a disk drive 1213 of Flash memory. Additionally, the computer 1200 may have one or more antenna 1208 for sending and receiving electromagnetic radiation that may be connected to a wireless data link and/or cellular telephone transceiver 1216 coupled to the processor 1202. The computer 1200 may also include a floppy disc drive 1214 and a compact disc (CD) drive 1215 coupled to the processor 1202. In a notebook configuration, the computer housing includes the touchpad 1217, the keyboard 1218, and the display 1219 all coupled to the processor 1202. Other configurations of the computing device may include a computer mouse or trackball coupled to the processor (e.g., via a USB input) as are well known, which may also be used in conjunction with the various embodiments.

Figure 13:
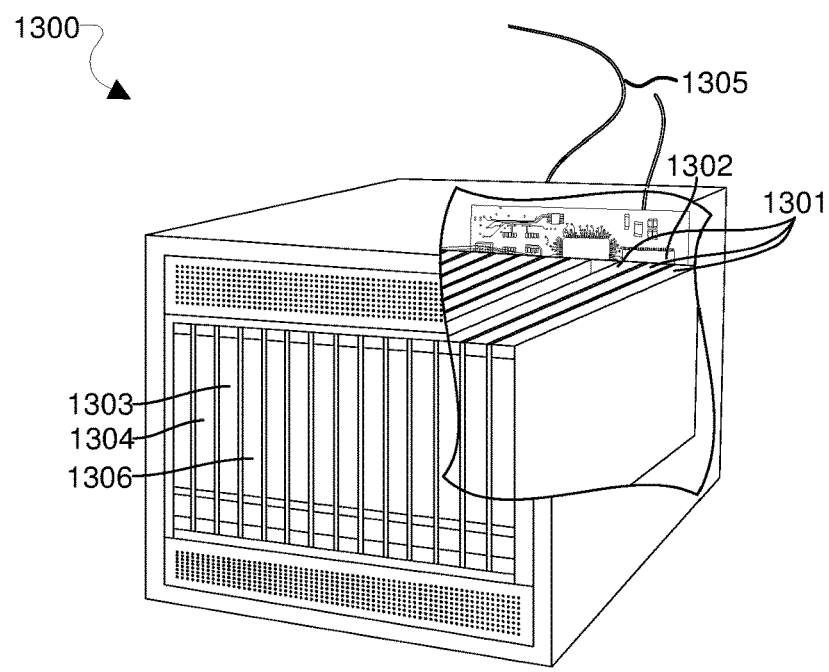
FIG. 13 is a component block diagram illustrating an example server suitable for use with the various embodiments.

The various embodiments (including, but not limited to, embodiments described above with reference to FIGS. 1-10) may also be implemented in fixed computing systems, such as any of a variety of commercially available servers. An example server 1300 is illustrated in FIG. 13. Such a server 1300 typically includes one or more multicore processor assemblies 1301 coupled to volatile memory 1302 and a large capacity nonvolatile memory, such as a disk drive 1304. As illustrated in FIG. 13, multicore processor assemblies 1301 may be added to the server 1300 by inserting them into the racks of the assembly. The server 1300 may also include a floppy disc drive, compact disc (CD) or digital versatile disc (DVD) disc drive 1306 coupled to the processor 1301. The server 1300 may also include network access ports 1303 coupled to the multicore processor assemblies 1301 for establishing network interface connections with a network 1305, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for cache memory power control, comprising:
   determining whether a processor is entering a power collapse mode of the processor; and
   switching a power collapse mode switch control signal to indicate to a cache power switch of the processor switching an electrical connection of a cache memory from a memory power rail to a processor power rail in response to determining that the processor is entering a power collapse mode;
   receiving the power collapse mode switch control signal;
   determining whether the power collapse mode switch control signal indicates to a cache power switch controller that the electrical connection of the cache memory should be switched from the memory power rail to the processor power rail;
   outputting a first switch selection control signal indicating to the cache power switch of the processor selectively electrically connecting the processor power rail to the cache memory in response to determining that the power collapse mode switch control signal indicates to the cache power switch controller that the electrical connection of the cache memory should be switched from the memory power rail to the processor power rail; and
   outputting a second switch selection control signal indicating to the cache power switch of the processor maintaining electrical connection of the processor power rail to the cache memory in response to determining that the power collapse mode switch control signal does not indicate to the cache power switch controller that the electrical connection of the cache memory should be switched from the memory power rail to the processor power rail.

2. The method of claim 1, further comprising receiving a processor low power mode signal indicating to a cache power collapse mode controller the power collapse mode of the processor, wherein determining whether the processor is entering a power collapse mode of the processor comprises interpreting by the cache power collapse mode controller that the processor low power mode signal indicates the power collapse mode of the processor.

3. The method of claim 1, further comprising:
   determining whether the processor is exiting the power collapse mode of the processor; and
   switching the power collapse mode switch control signal to indicate to the cache power switch of the processor that the electrical connection of the cache memory should be switched from the processor power rail to the memory power rail to in response to determining that the processor is exiting the power collapse mode.

4. The method of claim 3, further comprising:
   receiving a power rail state signal indicating to a cache power collapse mode controller a power rail state of the cache power switch of the processor;
   storing the power rail state; and
   in response to determining that the processor is exiting the power collapse mode:
      retrieving the stored power rail state; and
      determining whether the stored power rail state of the cache power switch of the processor indicates that the cache memory was connected to the memory power rail prior to the processor entering the power collapse mode, wherein switching the power collapse mode switch control signal to indicate to the cache power switch of the processor that the electrical connection of the cache memory should be switched from the processor power rail to the memory power rail occurs in response to determining that the stored power rail state of the cache power switch of the processor indicates that the cache memory was connected to the memory power rail prior to the processor entering the power collapse mode.

5. The method of claim 1, further comprising:
   comparing a voltage of the processor power rail and a voltage of the memory power rail;
   determining whether the voltage of the processor power rail exceeds the voltage of the memory power rail;
   outputting a first power rail state signal indicating to a cache power collapse mode controller switching to the processor power rail for the power collapse mode of the processor in response to determining that the voltage of the processor power rail does not exceed the voltage of the memory power rail; and
   outputting a second power rail state signal indicating to the cache power collapse mode controller that it should maintain electrical connection of the processor power rail to the cache memory for the power collapse mode of the processor in response to determining that the voltage of the processor power rail exceeds the voltage of the memory power rail.

6. The method of claim 1, further comprising:
   receiving a third switch selection control signal;
   determining whether the third switch selection control signal indicates to the cache power switch of the processor selectively electrically connecting the processor power rail to the cache memory;
   electrically connecting the processor power rail to the cache memory in response to determining that the third switch selection control signal indicates to the cache power switch of the processor selectively electrically connecting the processor power rail to the cache memory, wherein the third switch selection control signal is the first switch selection control signal; and maintaining electrical connection of the processor power rail to the cache memory in response to determining that the third switch selection control signal does not indicate to the cache power switch of the processor selectively electrically connecting the processor power rail to the cache memory, wherein the third switch selection control signal is the second switch selection control signal.

7. The method of claim 1, further comprising determining whether a power rail state of the cache power switch of the processor indicates that the cache memory is electrically connected to the memory power rail in response to determining that the processor is entering the power collapse mode, wherein switching a power collapse mode switch control signal to indicate to the cache power switch of the processor switching an electrical connection of a cache memory from a memory power rail to a processor power rail occurs in response to determining that the power rail state of the cache power switch of the processor indicates that the cache memory is electrically connected to the memory power rail.

8. A system on chip (SoC), comprising:
a processor having a cache memory;
a cache power switch configured to selectively electrically connect the cache memory to a memory power rail and a processor power rail;
a cache power collapse mode controller communicatively connected to the processor and the cache power switch, wherein the cache power collapse mode controller is configured to perform operations comprising:
determining whether the processor is entering a power collapse mode of the processor;
and
switching a power collapse mode switch control signal to indicate to the cache power switch switching an electrical connection of the cache memory from the memory power rail to the processor power rail in response to determining that the processor is entering a power collapse mode; and
a cache power switch controller communicatively connected to the cache power collapse mode controller and to the cache power switch, wherein the cache power switch controller is configured to perform operations comprising:
receiving the power collapse mode switch control signal;
determining whether the power collapse mode switch control signal indicates to the cache power switch controller that the electrical connection of the cache memory should be switched from the memory power rail to the processor power rail;
outputting a first switch selection control signal indicating to the cache power switch selectively electrically connecting the processor power rail to the cache memory in response to determining that the power collapse mode switch control signal indicates to the cache power switch controller that the electrical connection of the cache memory should be switched from the memory power rail to the processor power rail; and
outputting a second switch selection control signal indicating to the cache power switch maintaining electrical connection of the processor power rail to the cache memory in response to determining that the power collapse mode switch control signal does not indicate to the cache power switch controller that the electrical connection of the cache memory should be switched from the memory power rail to the processor power rail.

9. The SoC of claim 8, further comprising a processor power manager communicatively connected to the cache power collapse mode controller,
wherein the cache power collapse mode controller is configured to perform operations further comprising receiving a processor low power mode signal from the processor power manager indicating to the cache power collapse mode controller the power collapse mode of the processor, wherein determining whether the processor is entering a power collapse mode of the processor comprises interpreting by the cache power collapse mode controller that the processor low power mode signal indicates the power collapse mode of the processor.

10. The SoC of claim 8, wherein the cache power collapse mode controller is configured to perform operations further comprising:
determining whether the processor is exiting the power collapse mode of the processor; and
switching the power collapse mode switch control signal to indicate to the cache power switch that the electrical connection of the cache memory should be switched from the processor power rail to the memory power rail to in response to determining that the processor is exiting the power collapse mode.

11. The SoC of claim 10, wherein the cache power collapse mode controller is configured to perform operations further comprising:
receiving a power rail state signal from the cache power switch indicating to the cache power collapse mode controller a power rail state of the cache power switch;
storing the power rail state; and
in response to determining that the processor is exiting the power collapse mode:
retrieving the stored power rail state; and
determining whether the stored power rail state of the cache power switch indicates that the cache memory was connected to the memory power rail prior to the processor entering the power collapse mode, wherein switching the power collapse mode switch control signal to indicate to the cache power switch that the electrical connection of the cache memory should be switched from the processor power rail to the memory power rail occurs in response to determining that the stored power rail state of the cache power switch indicates that the cache memory was connected to the memory power rail prior to the processor entering the power collapse mode.

12. The SoC of claim 8, wherein the cache power switch is configured to perform operations comprising:
comparing a voltage of the processor power rail and a voltage of the memory power rail;
determining whether the voltage of the processor power rail exceeds the voltage of the memory power rail;
outputting a first power rail state signal indicating to the cache power collapse mode controller switching to the processor power rail for the power collapse mode of the processor in response to determining that the voltage of the processor power rail does not exceed the voltage of the memory power rail; and
outputting a second power rail state signal indicating to the cache power collapse mode controller that it should maintain electrical connection of the processor power rail to the cache memory for the power collapse mode of the processor in response to determining that the voltage of the processor power rail exceeds the voltage of the memory power rail.

13. The SoC of claim 8, wherein the cache power switch is configured to perform operations comprising:
receiving a third switch selection control signal;
determining whether the third switch selection control signal indicates to the cache power switch selectively electrically connecting the processor power rail to the cache memory;
electrically connecting the processor power rail to the cache memory in response to determining that the third switch selection control signal indicates to the cache power switch selectively electrically connecting the processor power rail to the cache memory, wherein the third switch selection control signal is the first switch selection control signal; and
maintaining electrical connection of the processor power rail to the cache memory in response to determining that the third switch selection control signal does not indicate to the cache power switch selectively electrically connecting the processor power rail to the cache memory, wherein the third switch selection control signal is the second switch selection control signal.

14. The SoC of claim 8, wherein the cache power collapse mode controller is configured to perform operations further comprising determining whether a power rail state of the cache power switch indicates that the cache memory is electrically connected to the memory power rail in response to determining that the processor is entering the power collapse mode, wherein switching a power collapse mode switch control signal to indicate to the cache power switch switching an electrical connection of the cache memory from the memory power rail to the processor power rail occurs in response to determining that the power rail state of the cache power switch indicates that the cache memory is electrically connected to the memory power rail.

15. A system on chip (SoC), comprising:
means for determining whether a processor is entering a power collapse mode of the processor; and
means for switching a power collapse mode switch control signal to indicate to a cache power switch of the processor switching an electrical connection of a cache memory from a memory power rail to a processor power rail in response to determining that the processor is entering a power collapse mode;
means for receiving the power collapse mode switch control signal;
means for determining whether the power collapse mode switch control signal indicates to a cache power switch controller that the electrical connection of the cache memory should be switched from the memory power rail to the processor power rail;
means for outputting a first switch selection control signal indicating to the cache power switch of the processor selectively electrically connecting the processor power rail to the cache memory in response to determining that the power collapse mode switch control signal indicates to the cache power switch controller that the electrical connection of the cache memory should be switched from the memory power rail to the processor power rail; and
means for outputting a second switch selection control signal indicating to the cache power switch of the processor maintaining electrical connection of the processor power rail to the cache memory in response to determining that the power collapse mode switch control signal does not indicate to the cache power switch controller that the electrical connection of the cache memory should be switched from the memory power rail to the processor power rail.

16. The SoC of claim 15, further comprising means for receiving a processor low power mode signal indicating to a cache power collapse mode controller the power collapse mode of the processor, wherein means for determining whether the processor is entering a power collapse mode of the processor comprises means for interpreting that the processor low power mode signal indicates the power collapse mode of the processor.

17. The SoC of claim 15, further comprising:
means for determining whether the processor is exiting the power collapse mode of the processor; and
means for switching the power collapse mode switch control signal to indicate to the cache power switch of the processor that the electrical connection of the cache memory should be switched from the processor power rail to the memory power rail to in response to determining that the processor is exiting the power collapse mode.

18. The SoC of claim 17, further comprising:
means for receiving a power rail state signal indicating to a cache power collapse mode controller a power rail state of the cache power switch of the processor;
means for storing the power rail state; and
means for in response to determining that the processor is exiting the power collapse mode:
retrieving the stored power rail state; and
determining whether the stored power rail state of the cache power switch of the processor indicates that the cache memory was connected to the memory power rail prior to the processor entering the power collapse mode, wherein switching the power collapse mode switch control signal to indicate to the cache power switch of the processor that the electrical connection of the cache memory should be switched from the processor power rail to the memory power rail occurs in response to determining that the stored power rail state of the cache power switch of the processor indicates that the cache memory was connected to the memory power rail prior to the processor entering the power collapse mode.

19. The SoC of claim 15, further comprising:
means for comparing a voltage of the processor power rail and a voltage of the memory power rail;
means for determining whether the voltage of the processor power rail exceeds the voltage of the memory power rail;
means for outputting a first power rail state signal indicating to a cache power collapse mode controller switching to the processor power rail for the power collapse mode of the processor in response to determining that the voltage of the processor power rail does not exceed the voltage of the memory power rail; and
means for outputting a second power rail state signal indicating to the cache power collapse mode controller that it should maintain electrical connection of the processor power rail to the cache memory for the power collapse mode of the processor in response to determining that the voltage of the processor power rail exceeds the voltage of the memory power rail.

20. The SoC of claim 15, further comprising:
  means for receiving a third switch selection control signal;
  means for determining whether the third switch selection control signal indicates to the cache power switch of the processor selectively electrically connecting the processor power rail to the cache memory;
  means for electrically connecting the processor power rail to the cache memory in response to determining that the third switch selection control signal indicates to the cache power switch of the processor selectively electrically connecting the processor power rail to the cache memory, wherein the third switch selection control signal is the first switch selection control signal; and
  means for maintaining electrical connection of the processor power rail to the cache memory in response to determining that the third switch selection control signal does not indicate to the cache power switch of the processor selectively electrically connecting the processor power rail to the cache memory, wherein the third switch selection control signal is the second switch selection control signal.

21. The SoC of claim 15, further comprising means for determining whether a power rail state of the cache power switch of the processor indicates that the cache memory is electrically connected to the memory power rail in response to determining that the processor is entering the power collapse mode, wherein switching a power collapse mode switch control signal to indicate to the cache power switch of the processor switching an electrical connection of a cache memory from a memory power rail to a processor power rail occurs in response to determining that the power rail state of the cache power switch of the processor indicates that the cache memory is electrically connected to the memory power rail.

22. A non-transitory, processor-readable medium having stored thereon processor-executable instructions configured to cause a processor to perform operations comprising:
  determining whether a processor is entering a power collapse mode of the processor; and
  switching a power collapse mode switch control signal to indicate to a cache power switch of the processor switching an electrical connection of a cache memory from a memory power rail to a processor power rail in response to determining that the processor is entering a power collapse mode;
  receiving the power collapse mode switch control signal;
  determining whether the power collapse mode switch control signal indicates to a cache power switch controller that the electrical connection of the cache memory should be switched from the memory power rail to the processor power rail;
  outputting a first switch selection control signal indicating to the cache power switch of the processor selectively electrically connecting the processor power rail to the cache memory in response to determining that the power collapse mode switch control signal indicates to the cache power switch controller that the electrical connection of the cache memory should be switched from the memory power rail to the processor power rail; and
  outputting a second switch selection control signal indicating to the cache power switch of the processor maintaining electrical connection of the processor power rail to the cache memory in response to determining that the power collapse mode switch control signal does not indicate to the cache power switch controller that the electrical connection of the cache memory should be switched from the memory power rail to the processor power rail.

23. The non-transitory, processor-readable medium of claim 22, wherein the stored processor-executable instructions are configured to cause the processor to perform operations further comprising receiving a processor low power mode signal indicating to a cache power collapse mode controller the power collapse mode of the processor, wherein determining whether the processor is entering a power collapse mode of the processor comprises interpreting by the cache power collapse mode controller that the processor low power mode signal indicates the power collapse mode of the processor.

24. The non-transitory, processor-readable medium of claim 22, wherein the stored processor-executable instructions are configured to cause the processor to perform operations further comprising:
  determining whether the processor is exiting the power collapse mode of the processor; and
  switching the power collapse mode switch control signal to indicate to the cache power switch of the processor that the electrical connection of the cache memory should be switched from the processor power rail to the memory power rail to in response to determining that the processor is exiting the power collapse mode.

25. The non-transitory, processor-readable medium of claim 24, wherein the stored processor-executable instructions are configured to cause the processor to perform operations further comprising:
  receiving a power rail state signal indicating to a cache power collapse mode controller a power rail state of the cache power switch of the processor;
  storing the power rail state; and
  in response to determining that the processor is exiting the power collapse mode:
    retrieving the stored power rail state; and
    determining whether the stored power rail state of the cache power switch of the processor indicates that the cache memory was connected to the memory power rail prior to the processor entering the power collapse mode, wherein switching the power collapse mode switch control signal to indicate to the cache power switch of the processor that the electrical connection of the cache memory should be switched from the processor power rail to the memory power rail occurs in response to determining that the stored power rail state of the cache power switch of the processor indicates that the cache memory was connected to the memory power rail prior to the processor entering the power collapse mode.

26. The non-transitory, processor-readable medium of claim 22, wherein the stored processor-executable instructions are configured to cause the processor to perform operations further comprising:
  comparing a voltage of the processor power rail and a voltage of the memory power rail;
  determining whether the voltage of the processor power rail exceeds the voltage of the memory power rail;
  outputting a first power rail state signal indicating to a cache power collapse mode controller switching to the processor power rail for the power collapse mode of the processor in response to determining that the voltage of the processor power rail does not exceed the voltage of the memory power rail; and outputting a second power rail state signal indicating to the cache power collapse mode controller that it should maintain electrical connection of the processor power rail to the cache memory for the power collapse mode of the processor in response to determining that the voltage of the processor power rail exceeds the voltage of the memory power rail.

27. The non-transitory, processor-readable medium of claim 22, wherein the stored processor-executable instructions are configured to cause the processor to perform operations further comprising:

receiving a third switch selection control signal;

determining whether the third switch selection control signal indicates to the cache power switch of the processor selectively electrically connecting the processor power rail to the cache memory;

electrically connecting the processor power rail to the cache memory in response to determining that the third switch selection control signal indicates to the cache power switch of the processor selectively electrically connecting the processor power rail to the cache memory, wherein the third switch selection control signal is the first switch selection control signal; and maintaining electrical connection of the processor power rail to the cache memory in response to determining that the third switch selection control signal does not indicate to the cache power switch of the processor selectively electrically connecting the processor power rail to the cache memory, wherein the third switch selection control signal is the second switch selection control signal.

28. The non-transitory, processor-readable medium of claim 22, wherein the stored processor-executable instructions are configured to cause the processor to perform operations further comprising determining whether a power rail state of the cache power switch of the processor indicates that the cache memory is electrically connected to the memory power rail in response to determining that the processor is entering the power collapse mode, wherein switching a power collapse mode switch control signal to indicate to the cache power switch of the processor switching an electrical connection of a cache memory from a memory power rail to a processor power rail occurs in response to determining that the power rail state of the cache power switch of the processor indicates that the cache memory is electrically connected to the memory power rail.

* * * * *